United States Patent
Takahashi

(10) Patent No.: US 11,446,576 B2
(45) Date of Patent: Sep. 20, 2022

(54) COMPUTER SYSTEM, SERVER SYSTEM, GAME SYSTEM, AND METHOD FOR GAME EXECUTION CONTROL

(71) Applicant: BANDAI NAMCO ENTERTAINMENT INC., Tokyo (JP)

(72) Inventor: Toru Takahashi, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 42 days.

(21) Appl. No.: 17/039,161

(22) Filed: Sep. 30, 2020

(65) Prior Publication Data
US 2021/0093970 A1    Apr. 1, 2021

(30) Foreign Application Priority Data

Sep. 30, 2019 (JP) .............................. JP2019-179997
Sep. 30, 2019 (JP) .............................. JP2019-179998
Sep. 30, 2019 (JP) .............................. JP2019-179999

(51) Int. Cl.
 *A63F 13/537*   (2014.01)
 *A63F 13/35*    (2014.01)

(52) U.S. Cl.
CPC ............ *A63F 13/537* (2014.09); *A63F 13/35* (2014.09)

(58) Field of Classification Search
None
See application file for complete search history.

(56) References Cited

U.S. PATENT DOCUMENTS

| 6,222,546 | B1 | 4/2001 | Yokoyama et al. |
| 6,731,278 | B2 | 5/2004 | Yokoyama et al. |
| 11,076,128 | B1* | 7/2021 | Krol ......................... G06T 15/04 |
| 2001/0040586 | A1 | 11/2001 | Yokoyama et al. |
| 2015/0346964 | A1* | 12/2015 | Tamura .................... A63F 13/57 463/2 |
| 2020/0306649 | A1* | 10/2020 | Aita ......................... A63F 13/35 |
| 2020/0306651 | A1* | 10/2020 | Tsukanaka .............. A63F 13/86 |
| 2021/0283504 | A1* | 9/2021 | Ikeda .................... G06F 3/0481 |

FOREIGN PATENT DOCUMENTS

JP          2000-149059 A    5/2000

* cited by examiner

*Primary Examiner* — Ronald Laneau
(74) *Attorney, Agent, or Firm* — Oliff PLC

(57) ABSTRACT

A server system controls execution of a game where a plurality of characters including a player character operated by at least one player move in a game space. In the server system, a first movement control section performs a control to provide a predetermined identification display on the track of movement of the first character. A second movement control section changes a display mode of the identification display when a second character that is the same as the first character or is different from the first character has moved through a position with the identification display in an overlapping manner.

19 Claims, 14 Drawing Sheets

FIG.5

INITIAL APPEARANCE CONDITION DATA (521)

| APPEARANCE POSITION NUMBER | APPEARANCE CONDITION — APPEARANCE ITEM TYPE | APPEARANCE CONDITION — APPEARANCE TIMING | ACQUISITION CONDITION | UNIT SCORING POINTS | |
|---|---|---|---|---|---|
| XXX | COOKIE | BEGINNING OF GAME | UNLIMITED | 1 | |
| XXX | COOKIE | BEGINNING OF GAME | UNLIMITED | 1 | |
| ⋮ | ⋮ | ⋮ | ⋮ | ⋮ | |
| XXX | POWER COOKIE | BEGINNING OF GAME | UNLIMITED | — | |
| XXX | COOKIE | BEGINNING OF GAME | UNLIMITED | 1 | |
| XXX | COOKIE | BEGINNING OF GAME | UNLIMITED | 1 | |
| XXX | FRUIT | UNTIL LAPSE OF APPEARANCE TIME T11 SINCE PLAYER-SPECIFIC SCORE OF ANY PLAYER HAS REACHED PREDETERMINED VALUE V11 | RELEVANT PLAYER'S PLAYER CHARACTER | 100 | R11 |
| ⋮ | ⋮ | ⋮ | ⋮ | ⋮ | |
| XXX | FRUIT | UNTIL LAPSE OF APPEARANCE TIME T13 SINCE ANY GROUP-SPECIFIC SCORE HAS REACHED PREDETERMINED VALUE V13 | PLAYER CHARACTER BELONGING TO RELEVANT GROUP | 300 | |
| XXX | COOKIE | BEGINNING OF GAME | UNLIMITED | 1 | |
| ⋮ | ⋮ | ⋮ | ⋮ | ⋮ | |

FIG.10

LEVEL-SPECIFIC APPEARANCE CONDITION DATA

TRACK LEVEL — 524

| APPEARANCE POSITION NUMBER | APPEARANCE CONDITION | | ACQUISITION CONDITION | UNIT SCORING POINTS |
| --- | --- | --- | --- | --- |
| | APPEARANCE ITEM TYPE | APPEARANCE TIMING | | |
| XXX | COOKIE | T21 | UNLIMITED | 3 |
| XXX | COOKIE | T21 | UNLIMITED | 3 |
| ⋮ | ⋮ | ⋮ | ⋮ | ⋮ |
| XXX | POWER COOKIE | T23 | UNLIMITED | — |
| XXX | POWER COOKIE | T23 | ONLY CASUAL CHARACTERS | — |
| XXX | COOKIE | T21 | UNLIMITED | 3 |
| XXX | FRUIT | T25 | PLAYER CHARACTERS BELONGING TO GROUP ASSOCIATED WITH GROUP-SPECIFIC IDENTIFICATION DISPLAY | 200 |
| ⋮ | ⋮ | ⋮ | ⋮ | ⋮ |
| XXX | POWER COOKIE | T23 | ONLY FIRST CHARACTER | — |
| XXX | FRUIT | T27 | PLAYER CHARACTERS BELONGING TO GROUP ASSOCIATED WITH GROUP-SPECIFIC IDENTIFICATION DISPLAY | 300 |
| ⋮ | ⋮ | ⋮ | ⋮ | ⋮ |

IDENTIFICATION DISPLAY MANAGEMENT TABLE

| APPEARANCE POSITION NUMBER | IDENTIFICATION DISPLAY FLAG (ON/OFF) | CURRENT TRACK LEVEL | ERASE TIMING |
|---|---|---|---|
| XXX | | | |
| XXX | | | |
| ⋮ | ⋮ | ⋮ | ⋮ |

ITEM APPEARANCE SETTING TABLE

| APPEARANCE POSITION NUMBER | APPEAR-ANCE FLAG (ON/OFF) | APPLIED APPEARANCE CONDITION | | APPLIED ACQUISI-TION CONDITION | APPLIED UNIT SCORING POINTS |
|---|---|---|---|---|---|
| | | APPEARANCE ITEM TYPE | APPEARANCE TIMING | | |
| XXX | | | | | |
| XXX | | | | | |
| ⋮ | ⋮ | ⋮ | ⋮ | ⋮ | ⋮ |

COMPUTER SYSTEM, SERVER SYSTEM, GAME SYSTEM, AND METHOD FOR GAME EXECUTION CONTROL

CROSS REFERENCE TO RELATED APPLICATION

This application is based upon and claims the benefit of priority to Japanese Patent Application No. 2019-179997 filed on Sep. 30, 2019, Japanese Patent Application No. 2019-179998 filed on Sep. 30, 2019, and Japanese Patent Application No. 2019-179999 filed on Sep. 30, 2019, the entire contents of which are incorporated herein by reference.

BACKGROUND

As a technique for, in a game where players enjoy performing operations to move the characters, adding interest to the tracks of movement of characters, for example, Japanese Unexamined Patent Application Publication No. 2000-149059 describes in paragraph [0003] that, in a driving game (car racing game), tire marks, which are the track of moving of vehicles (characters), are used as parameters for special effects to vehicle behaviors.

However, in a game where players enjoy performing operations to move the characters, there is found no special technique for adding interest to the track of movement of characters other than the above-described technique for tire marks.

BRIEF DESCRIPTION OF THE DRAWINGS

FIG. 5 is a diagram illustrating an example of a data configuration of initial appearance condition data.

FIG. 10 is a diagram illustrating an example of a data configuration of level-specific appearance condition data.

FIG. 13 is a diagram illustrating an example of a data configuration of an identification display management table.

FIG. 14 is a diagram illustrating an example of a data configuration of an item appearance setting table.

DESCRIPTION OF EXEMPLARY EMBODIMENTS

Figure 1:
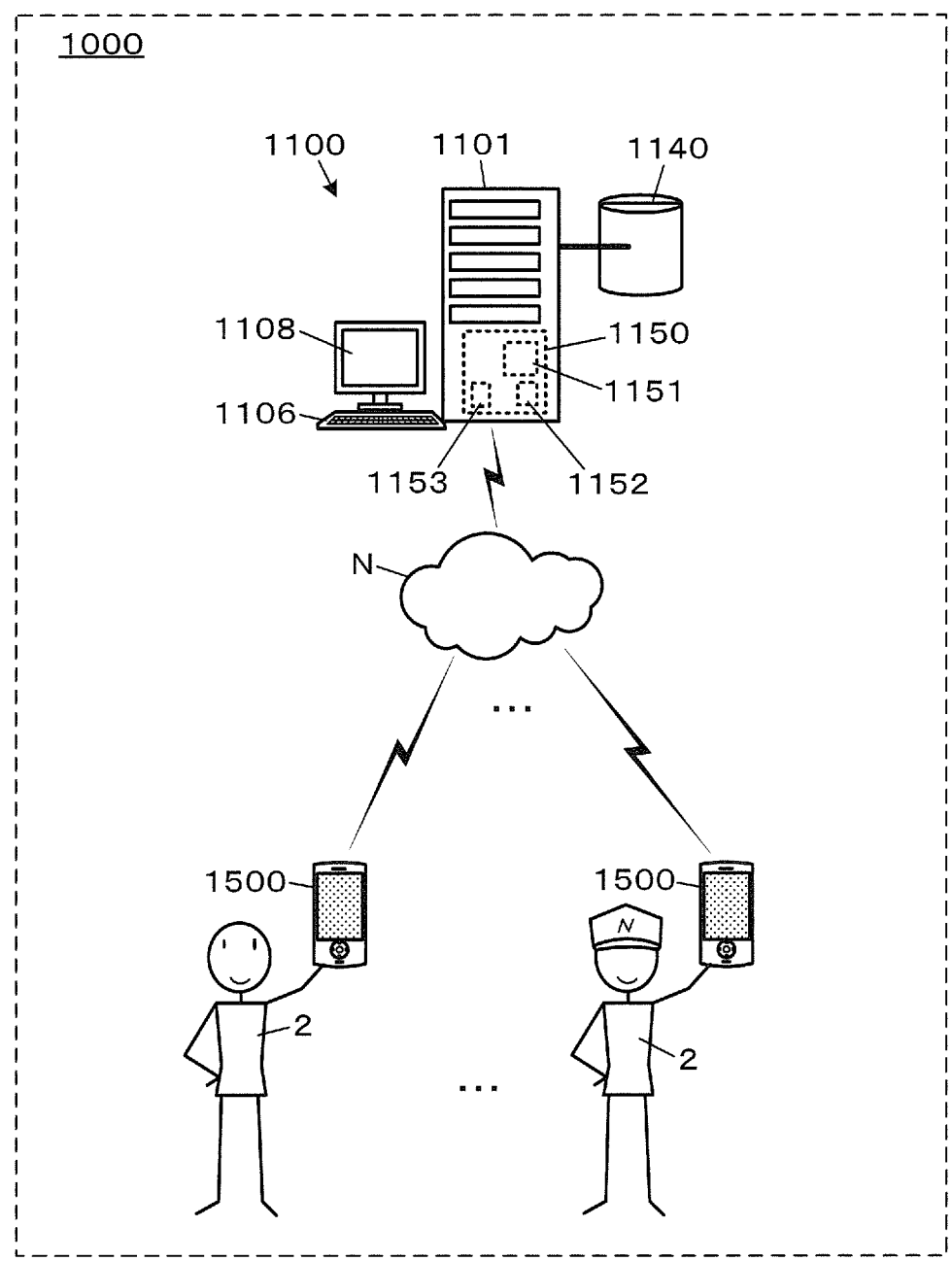
FIG. 1 is a diagram illustrating an example of a whole configuration of a game system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

According to the first aspect of the invention, there is provided a computer system comprising:

at least one processor or circuit programmed to:

manage a game where a plurality of characters including a player character operated by at least one player move in a game space;

perform a control to provide a predetermined identification display on a track of movement of a first character; and when a second character that is the same character as the first character or a character different from the first character has moved through a position with the identification display in an overlapping manner, change a display mode of the identification display.

According to the second aspect of the invention, there is provided a computer system comprising:

at least one processor or circuit programmed to:

manage a game where a plurality of characters including a player character operated by at least one player are moved in a game space and caused to acquire an item arranged in the game space;

perform a control on each character to provide a predetermined identification display on a track of movement of the character; and perform a control to cause the item to appear at the position with the identification display;

perform a control to cause the character having moved through the arrangement position of the item to acquire the item; and control progress of the game based on an acquisition result of the item.

According to the third aspect of the invention, there is provided a computer system comprising:

at least one processor or circuit programmed to:

manage a game where a plurality of characters including a player character operated by at least one player move in a game space;

change a parameter value of the character based on play status of the character; and perform a control to provide an identification display of a display mode in accordance with the parameter value of the character on a track of movement of the character.

Exemplary embodiments are described below. Note that the following exemplary embodiments do not in any way limit the scope of the content defined by the claims laid out herein. Note also that all of the elements described in the present embodiment should not necessarily be taken as essential elements

Whole Configuration

FIG. 1 is a diagram illustrating an example of a whole configuration of a game system 1000 in accordance with the present embodiment. As illustrated in FIG. 1, the game system 1000 includes a server system 1100 as a computer system and a player terminal 1500 possessed by a player (a user) 2 playing a game in accordance with the present embodiment. The server system 1100 and the player terminal 1500 are connected to perform data communication with each other via a network N.

The network N is a communication channel that enables data communications. Specifically, the network N includes a communication network such as a local area network (LAN) using a private line (a private cable) for direct connection, Ethernet (registered trademark), or the like, a telecommunication network, a cable network, and an Internet. A communication method may be a cable communication method or a wireless communication method.

The server system 1100 includes a main body device 1101, a keyboard 1106, a touch panel 1108, and a storage 1140. The main body device 1101 includes a control board 1150 on which mounted are electronic components including various microprocessors such as a central processing unit (CPU) 1151, a graphics processing unit (GPU), and a digital signal processor (DSP), various IC memories 1152 such as VRAM, RAM, and ROM, and a communication device 1153. The control board 1150 may be entirely or partially implemented by an application specific integrated circuit (ASIC), a field-programmable gate array (FPGA), or a system on a chip (SoC).

Through a calculation process performed by the CPU 1151 or the like based on a predetermined program and data, the server system 1100 implements a user management function related to user registration or the like and a game management function of providing data required to play the game with the player terminal 1500 to manage an execution control on the game played with the player terminal 1500. That is, the game in accordance with the present embodiment is implemented as a kind of client-server online game. The player 2 uses his/her own player terminal 1500 to access the server system 1100 and log in with an issued account to play the game in accordance with the present embodiment.

The server system 1100 is not limited to a single server configuration illustrated in FIG. 1, and may be configured such that a plurality of blade servers are connected via an internal bus to perform data communication to share the functions. Alternatively, the server system 1100 may be configured such that a plurality of independent server devices installed at remote places perform data communication via the network N to serve as the server system 1100 as a whole.

The player terminal 1500 is a computer system that functions as a man-machine interface, and connects to the network N via a mobile phone base station, a wireless communication base station, or the like to perform data communication with the server system 1100. The player terminal 1500 may be implemented as, for example, a smartphone, a mobile phone, a portable game device, a stationary consumer game device, a controller of the stationary consumer game device, an arcade game apparatus, a personal computer, a tablet computer, or a wearable computer.

Figure 2:
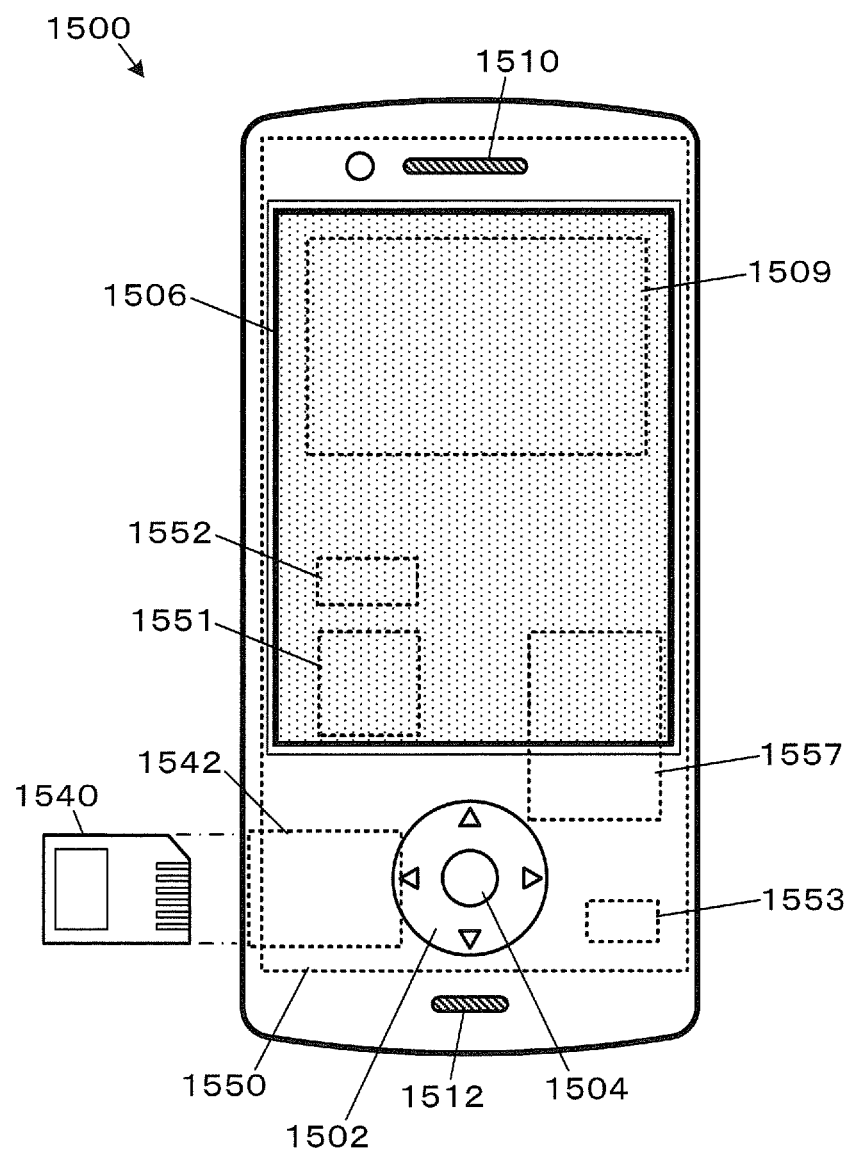
FIG. 2 is a diagram illustrating an example of a device configuration of a player terminal.

FIG. 2 is a diagram illustrating an example of a device configuration of a smartphone serving as the player terminal 1500. As illustrated in FIG. 2, the player terminal 1500 includes an arrow key 1502, a home key 1504, a touch panel 1506 that functions as an image display device and a touch position input device, a built-in battery 1509, a speaker 1510, a microphone 1512, a control board 1550, and a memory card reader 1542 that can write and read data on and from a memory card 1540 that is a computer readable storage medium. The player terminal 1500 further includes a power button, a volume control button, or the like (not illustrated).

The control board 1550 includes, for example, a microprocessor of various types (e.g., a CPU 1551, a GPU, or a DSP), an IC memory 1552 of various types (e.g., a VRAM, a RAM, or a ROM), and a wireless communication module 1553 for performing wireless communication with a mobile phone base station, a wireless LAN base station, or the like connected to the network N. The control board 1550 includes so-called I/F circuits (interface circuits) 1557 including a circuit that receives signals from the arrow key 1502 and the home key 1504, a driver circuit for the touch panel 1506, an output amplifier circuit that outputs a sound signal to the speaker 1510, an audio signal generation circuit that generates a signal corresponding to the sound collected by the microphone 1512, and a signal input-output circuit that inputs and outputs a signal to and from the memory card reader 1542. These elements included in the control board 1550 are electrically connected through a bus circuit or the like so that the elements can read and write data and exchange signals. The control board 1550 may be partially or entirely implemented by the ASIC, the FPGA, or the SoC.

The IC memory 1552 in the control board 1550 stores, for example, a game client program and various types of setting data required to execute the game client program. The game client program or the like is downloaded from the server system 1100 at an appropriate timing. Alternatively, the game client program or the like may be read out from a storage medium such as the memory card 1540 separately provided. The CPU 1551 or the like executes the game client program to perform a calculation process, and controls each section of the player terminal 1500 to enable gameplay of the player 2 in accordance with an operation input with the touch panel 1506, the arrow key 1502, and the home key 1504.

The game in the present embodiment is a competition game where groups (teams) composed of player characters compete against each other. In the game, multiple players divide into two groups to play against each other's opponent group. The competition is finished after a lapse of a predetermined limited time period, and the group having finally gained a higher group-specific game score (hereinafter, called "group-specific score") becomes the winner. There are no particular limits on the number of competing groups, the number of players constituting the groups, and the number of player characters operated by each player. There is also no particular limit on termination conditions for the game. The game may be terminated when all the players in one group have become out of the game.

Figure 3:
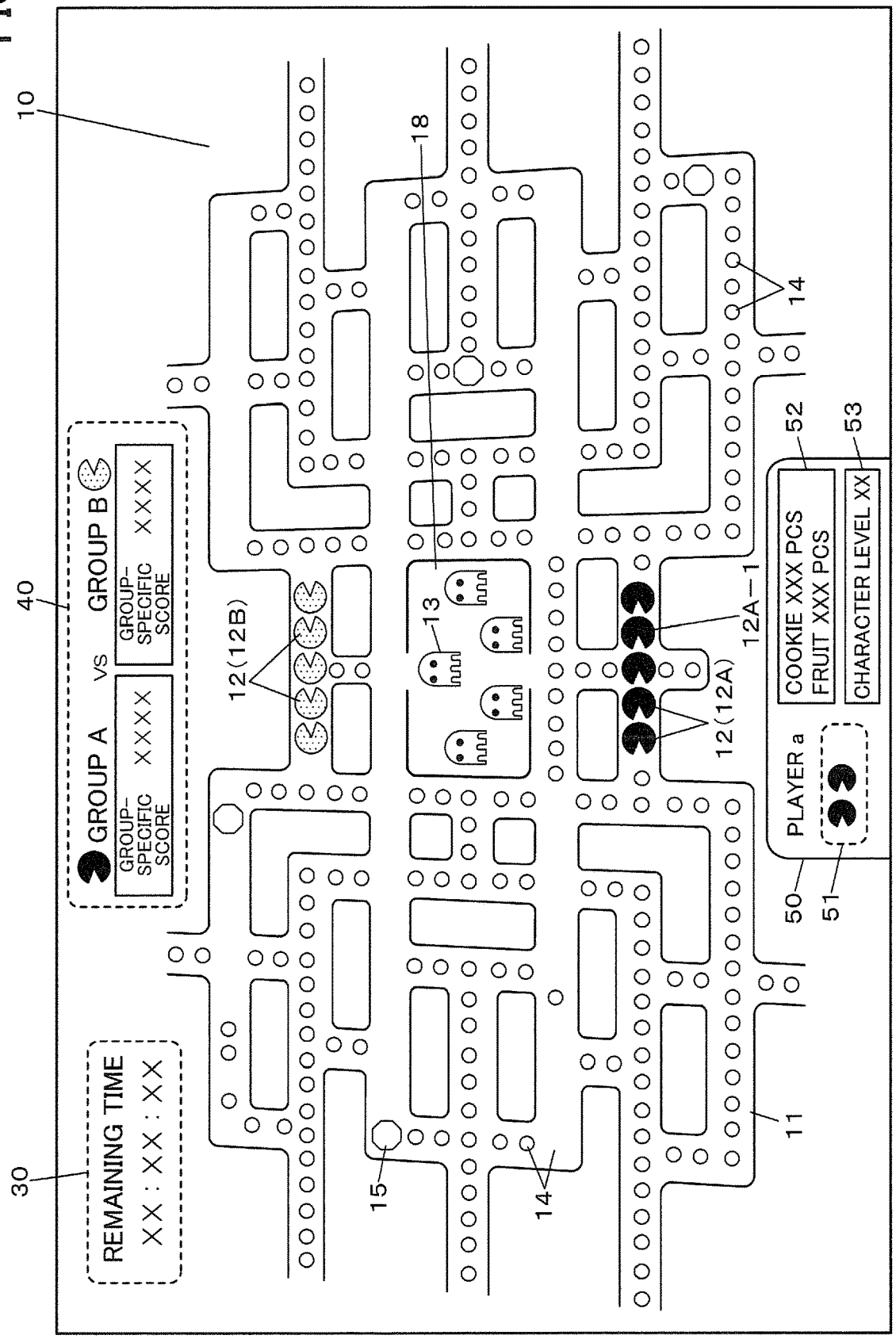
FIG. 3 is a diagram illustrating an example of a game screen.
Figure 4:
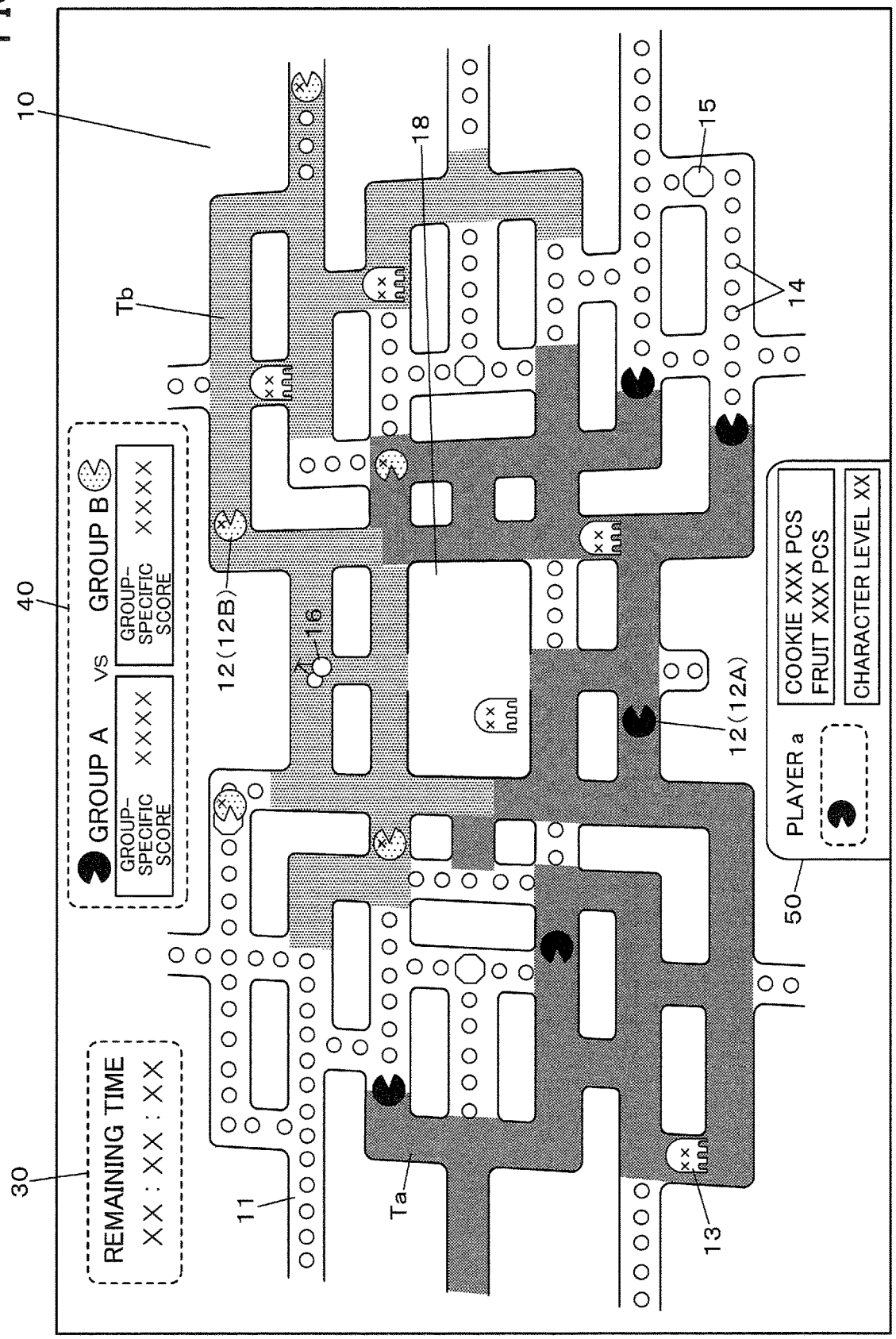
FIG. 4 is a diagram illustrating another example of a game screen.

FIGS. 3 and 4 are diagrams illustrating examples of game screens of the game in accordance with the present embodiment. FIG. 3 illustrates an example of a game screen at beginning of the game, and FIG. 4 illustrates an example of a game screen during the game. As illustrated in FIGS. 3 and 4, the game screen includes a game image display section 10 where images in game space (game images) are displayed, a remaining time display section 30, a group-specific score display section 40, and a play status display section 50.

The remaining time display section 30 displays the remaining time before the end of the game. In the present embodiment, the remaining time display section 30 displays the remaining time until the elapsed time after the beginning of the game reaches the limited time period. When the remaining time becomes "0", the game is terminated.

The group-specific score display section 40 displays the current group-specific scores of two competing groups (group A and group B in the example of FIG. 3 and others) continuously calculated for each group. The group-specific scores are calculated as group-specific total values of player-specific game scores (hereinafter, called "player-specific scores").

The player-specific scores are increased at acquisition of various items such as cookies 14, power cookies 15, and fruits 16. In the present embodiment, the cookies 14 and the fruits 16 are each assigned with unit scoring points. When a player character 12 acquires any of them, the unit scoring points associated with the item are added to the player's player-specific score.

The player-specific score is also increased when the player defeats a player character 12 in the opponent group or a disturbance character 13. For example, there are predetermined scoring points to be added for defeating a player character 12 in the opponent group and scoring points to be added for defeating a disturbance character 13. When a player character 12 defeats them, the scoring points associated with the defeated characters are added to the player's player-specific score.

The player-specific scores calculated by player as described above are added up by group to update the group-specific scores of the groups as needed, and are displayed on the group-specific score display section 40. Each player operates their own player character 12 to acquire cookies 14 and fruits 16 and defeat player characters 12 in the opponent group and disturbance characters 13, thereby aiming at the win of their own group.

The play status display section 50 includes a remaining life display section 51, an item acquisition status display section 52, and a level display section 53 so as to display the current play status of the player of the player terminal 1500 (self player). These display items in the play status display section 50 are mere examples and the display items may be set as appropriate. For example, besides the illustrated items, the play status display section 50 may include display of the player-specific score of the self player.

The remaining life display section 51 displays the number of the remaining player characters 12 (remaining lives) (two in the example of FIG. 3) that can be used by the self player at the current game. A predetermined number of player characters 12 (e.g. three lives) are provided to each player at the beginning of the game, for example. In addition, a new player character 12 is provided during the game when a predetermined condition, such as that the player-specific game score reaches a predetermined value, for example, is satisfied.

The item acquisition status display section 52 displays the current acquisition status of items that are acquirable during the game. In the present embodiment, the numbers of acquired cookies 14 and fruits 16 affecting the game score are updated and displayed as needed. The item acquisition status display section 52 may also display the number of acquired power cookies 15.

The level display section 53 displays a character level that is an example of a parameter value of the player character 12 operated by the self player. In the present embodiment, the character level is updated as needed in accordance with the number of acquired cookies 14. For example, the updating of the character level can be realized by presetting the correspondence relation between the necessary number of acquisitions and the character level (level conversion table) and raising the character level each time the number of the acquired cookies 14 reaches the necessary number of acquisitions. The number of the acquired cookies 14 may be the total number of acquisitions since the beginning of the game or may be the number of acquisitions since a player character 12 is defeated and turned into a remaining life. In the latter case, the character level returns to the initial level each time the player character 12 turns into a remaining life. The character level may be updated in accordance with not only the number of the acquired cookies 14 but also the number of the acquired power cookies 15 and fruits 16.

Detailed descriptions of the game in accordance with the present embodiment will be provided with reference to the contents displayed on the game image display section 10 illustrated in FIGS. 3 and 4. First, the game space includes respective player characters 12 (12A and 12B) in competing groups A and B, disturbance characters 13, and various items such as cookies 14, power cookies 15, and fruits 16, which are arranged in a maze-like stage serving as a setting. FIG. 3 illustrates an initial arrangement of the characters and the items at the beginning of the game.

The player characters 12A in the group A and the player characters 12B in the group B are displayed in a mode such that their respective groups are identifiable. In the present embodiment, group colors are respectively preset for the groups A and B so that the player characters 12A and 12B are displayed in their respective group colors. For example, the group color of the group A is set to "red" and the group color of the group B to "blue", and the player characters 12A and 12B are displayed in their respective colors. Instead of colors, the groups may be identified by different shapes or patterns of the player characters. The groups may be identified by adding marks indicative of their groups or the like to the player characters.

The disturbance characters 13 are computer-controlled to move in passages 11 in the maze from a den 18 as a start point and to pursue the player characters 12. Although the five disturbance characters 13 are illustrated in the example of FIG. 3 and the like, the disturbance characters 13 are not particularly limited in number. Furthermore, in accordance with the present embodiment, all the five disturbance characters 13 are of the same type. However, an enemy character that has different appearance or different moving characteristics (e.g., moving speed or a pursuing movement pattern) may be included.

The cookies 14, the power cookies 15, and the fruits 16 are arranged on the passages 11 where the player characters 12 are movable. In the present embodiment, appearance positions 111 of the items (see FIG. 6 and others) are predetermined along the passages 11, and the types of the items to appear and an appearance condition for appearance timing (a first appearance condition) are preset. The appearance condition may be set including the numbers of the items to appear. The cookies 14, the power cookies 15, and the fruits 16 are arranged at the respective appearance positions 111 in accordance with the corresponding appearance conditions. In more detail, the appearance conditions related to the initial arrangement and track level-specific appearance conditions described later are set in association at the appearance positions 111. At the beginning of the game, the items are arranged at the appearance positions 111 in accordance with the appearance conditions related to the initial arrangement.

Each player moves their own player character 12 in the maze while avoiding contact with the disturbance characters 13, and passes the player character 12 through the positions of the cookies 14, the power cookies 15, and the fruits 16 (the appearance positions 111 of these items) to acquire these items. In the event of contact with any of the disturbance characters 13 in error, the player character 12 is defeated by the disturbance character 13 and disappears. The player character 12 may be operated by the arrow key 1502 or by touch operation on the touch panel 1506. In the latter case, an arrow button is displayed at an appropriate place in the game screen to accept the touch operation.

Although the cookie 14 and the fruit 16 are both items assigned with unit scoring points, a large number of the cookies 14 are arranged in the maze from the beginning of the game, whereas the fruit 16 is arranged in accordance with the competition status after the beginning of the game. For example, the fruit 16 is arranged at a predetermined appearance position 111 for a predetermined appearance period at an appearance timing when the number of the acquired cookies 14 has reached a predetermined number, when the player-specific score of the own group has reached a predetermined value, or when the group-specific score of the own group has reached a predetermined value. The fruit 16 is set with a unit scoring point as a bonus score, which is higher than that of the cookie 14.

The fruit 16 can be set with an acquisition condition for limiting the player characters 12 who can acquire the fruit 16. For example, the appearance condition for the fruit 16 to appear at the appearance timing when the group-specific score has reached a predetermined value can be set with an acquisition condition for predetermining the player characters 12 in the relevant group as characters who can acquire the fruit 16 (e.g. see record R11 shown in FIG. 5).

On the other hand, the power cookie 15 is the item that weakens the player characters 12 and the disturbance characters 13. In the present embodiment, when a certain player character 12 acquires the power cookie 15, for example, the player characters 12 in the opponent group and the disturbance characters 13 change from "normal state" to "weak state" for a predetermined time period. After a lapse of the predetermined weakening time period from the acquisition of the power cookie 15, these characters return to the normal state. The normal state and the weak state are displayed so as to be identified by changing the forms of the characters such as color, shape, and pattern, and the characters' expressions or by adding marks indicative of these states. For example, the player characters 12A and 12B illustrated in FIG. 3 are in the normal state, and the player characters 12B and the disturbance characters 13 illustrated in FIG. 4 are in the weak state. The player character 12 in the weak state can no longer acquire any item, and no group-specific identification display is added to the track of its movement or no change is made to the display mode of the track of its movement.

Then, the player can bring the player character 12 in the normal state into contact with a character in the weak state to defeat the character in the weak state. If the defeated character is a disturbance character 13, the disturbance character 13 returns to the den 18 and waits for a certain time period, and then resumes pursuing movement. On the other hand, if the defeated character is a player character 12 and the player of the defeated player character 12 has any remaining life, the number of remaining lives is decremented by one and a player character 12 of the player is arranged at a position of initial arrangement. When running out of remaining lives, the player is out of the game.

In summary, each player moves their own player character 12 in the maze to acquire the cookies 14 and others while avoiding the disturbance characters 13. When their own or another player's player character 12 acquires the power cookie 15 to turn any character into the weak state, the player brings their own player character 12 into the character in the weak state to defeat the character in the weak state. When their own player character 12 goes into the weak state, the player waits for the player character 12 to return to the normal state while avoiding contact with characters in the normal state.

The effect of acquiring the power cookie 15 is not limited to the change from the "normal state" to the "weak state". When acquiring the power cookie 15, "characteristics" preset to the player characters in the own group, the player characters in the opponent group, and the disturbance characters may be changed to one another's. The "characteristics" herein are relative to other characters appearing in the game, which refer to, for example, the characters' positions, roles, and dominant-subordinate relationships such as "attacking party/attacked party", "predator/prey", "pursuer/fugitive", and "offense/defense". The changes of characteristics also include the changes of dominant-subordinate relative relationship related to the characters' attributes, the changes of compatibility relationship in amount of abilities given to the characters, the changes of the characters' states, and others.

Details

The server system 1100 performs an item initial arrangement process prior to the beginning of the game described above. On the other hand, during the game, the server system 1100 provides predetermined identification displays on the tracks of movement of the player characters 12 in the maze (a track display control process). At that time, the server system 1100 also performs a process of setting lifetimes of the provided identification displays, monitoring lapse of the lifetimes, and erasing the identification displays (lifetime control process).

The identification displays in the present embodiment are group-specific identification displays for identifying the competing groups (the groups A and B). Therefore, as shown in FIG. 4, the tracks of movement of the player characters 12A in the group A and the tracks of movement of the player characters 12B in the group B are displayed to be identifiable by their respective group-specific identification displays Ta and Tb. Referring to FIG. 4, the densely hatched group-specific identification display Ta corresponds to the group-specific identification display for the group A, and the lightly hatched group-specific identification display Tb corresponds to the group-specific identification display for the group B.

The actual display modes of the group-specific identification displays Ta and Tb are set and changed in accordance with the group to which a moving player character 12 belongs, the character level of the player character 12, the subsequent status of overlapping movement of the same or different player character 12, and the like.

The server system 1100 also performs a process of causing items to appear at the appearance positions 111 (an item appearance control process), a process of causing a player character 12 having moved through the arrangement position of an item to acquire the item (an item acquisition control process), and a process of calculating the group-specific scores (a score calculation process).

1) Item Initial Arrangement Process

In the item initial arrangement process, the server system 1100 performs a control to arrange items at the appearance positions 111 in accordance with the appearance conditions related to the initial arrangement. FIG. 5 is a diagram illustrating an example of a data configuration of initial appearance condition data 521 that defines the appearance conditions related to the initial arrangement. As illustrated in FIG. 5, the initial appearance condition data 521 is set with appearance conditions, acquisition conditions, and unit scoring points in association with appearance position numbers that are identification numbers for the appearance positions 111.

The appearance conditions are set with appearance item types and appearance timings.

The appearance item types define the types of items to appear. In the present embodiment, the item types are set to the cookie 14, the power cookie 15, or the fruit 16.

The appearance timing defines a timing at which the item (the item of the corresponding appearance type) is to appear at the appearance position 111. In the present embodiment, the cookie 14 and the power cookie 15 are set to appear at the "beginning of the game". On the other hand, the fruit 16 is set to appear for a time period until a predetermined time period elapses from a predetermined competition status. The competition status to be met can be set to the value of the player-specific score to be achieved, the value of the group-specific score, the number of the cookies 14 to be acquired, or a combination of them. For example, in the case of the record R11, when the player-specific score of any player participating in the game has reached a predetermined value V11, the fruit 16 appears at the appearance position 111 until a lapse of an appearance time T11 from that point in time.

The acquisition condition defines characters who can acquire the item caused to appear at the appearance position 111 in accordance with the corresponding appearance condition. In the present embodiment, the acquisition condition for the cookie 14 and the power cookie 15 in the initial appearance condition data 521 is "unlimited (all player characters can acquire the item)". On the other hand, the acquisition condition for the fruit 16 is set in correspondence with the competition status related to the appearance timing.

The unit scoring points define the number of points to be added to the player-specific score at the time of acquisition at the appearance position 111 where the corresponding type of the item to appear is the cookie 14 or the fruit 16.

In the item initial arrangement process, with reference to the initial appearance condition data 521, the cookies 14 and the power cookies 15 are arranged at the relevant appearance positions 111 at the beginning of the game, and the fruit 16 is caused to appear at the appearance position 111 at the appearance timing of the fruit 16.

2) Track Display Control Process

The track display control process includes: a first movement control process of performing a control to provide a group-specific identification display on the track of movement of one player character 12 (first character); and a second movement control process of, when a player character 12 in the same group as the first character or a second character that is a player character 12 in a different group from the group of the first character has performed overlapping movement through the position with the identification display, changing the display mode of the identification display at the position of the overlapping movement.

2-1) First Movement Control Process

Figure 6:
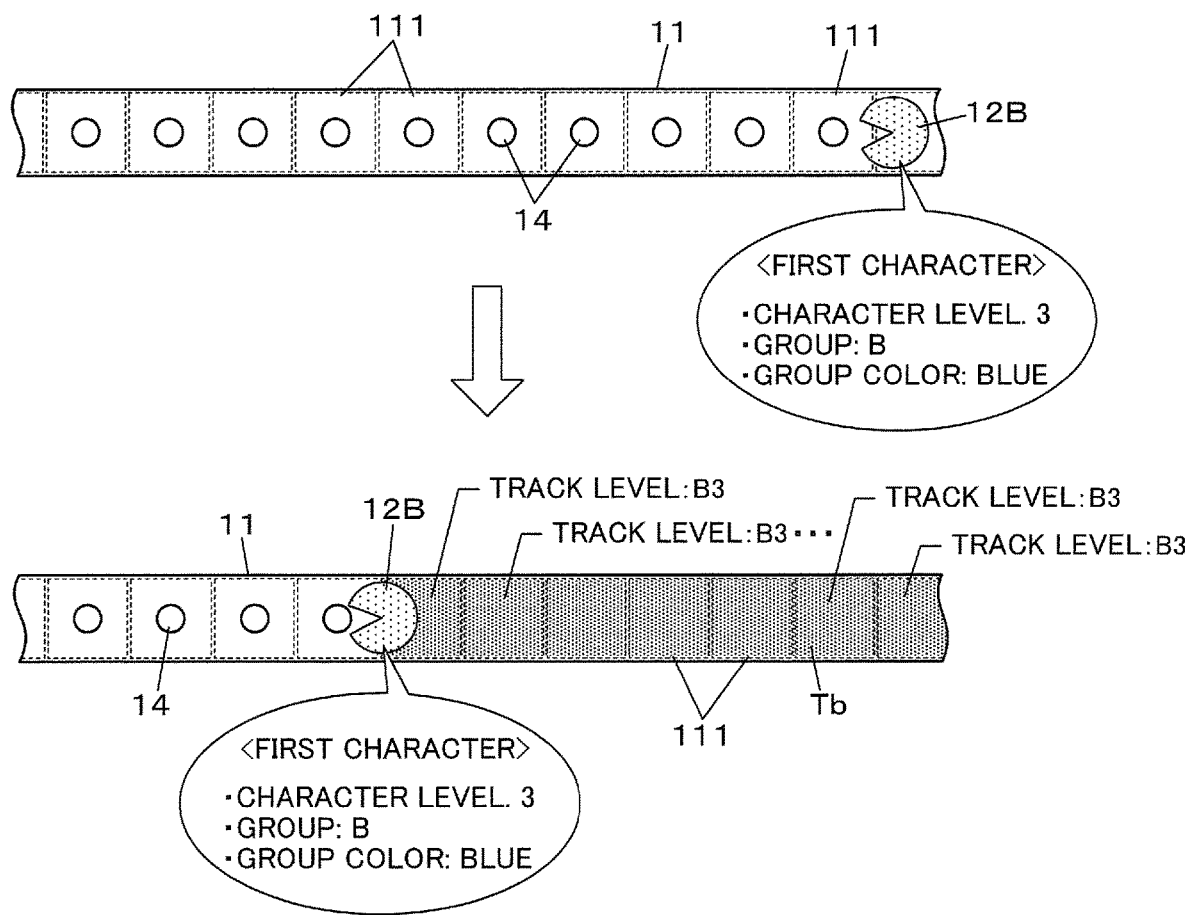
FIG. 6 is a diagram for describing a first movement control process.

FIG. 6 is a diagram for describing the first movement control process. As stated above, in the maze at the beginning of the game, the items such as the cookies 14 are arranged at the appearance positions 111 predetermined along the passage 11 in the initial arrangement state. Each player operates their own player character 12 (the player character 12B in the group B in the example of FIG. 6) to move through the appearance position 111 where an item is arranged and to acquire the item. In the first movement control process, the group-specific identification display Tb is provided as a predetermined identification display on the track of movement of the first character that is the player character 12B.

In more detail, in the present embodiment, positions of squares defined at regular intervals in the entire region of the passage 11 in the maze as shown by broken lines in FIG. 6, for example, are predetermined as the appearance positions 111. In the first movement control process, each appearance position 111 is set as one movement position, and each time the first character moves through a square of the appearance position 111, processes related to the determination of track level and the setting of display mode described below are performed to provide a group-specific identification display at the appearance position 111 that is the movement position (hereinafter, also called "target movement appearance position").

That is, in the first movement control process, first, for the target movement appearance position through which the first character has moved, the track level is determined from the first character's group and character level. The track level takes on, for example, a value obtained by adding a group identification code (group code) to a numerical value indicative of the level (level value). In the first movement control process, the track level is determined using the character level of the first character having moved as the level value. In the example of FIG. 6, since the first character is the player character 12B in the group B and its character level is "3", the track level is determined as "B3".

Next, the display mode of the group-specific identification display at the target movement appearance position is set in accordance with the determined track level. In the present embodiment, the group-specific identification display of the display mode corresponding to the track level is provided. Thus, the display mode is set by setting the display color of the group-specific identification display such that the color (hue) of the group-specific identification display is the group color of the group indicated by the group code and its light and shade (for example, chroma) is density in accordance with the level value. The correspondence relation between the level value and the chroma value can be predetermined.

After that, the group-specific identification display is provided by performing a control to display the square at the target movement appearance position in the set display color. The foregoing process is repeated along with the movement of the first character so that, in the example of FIG. 6, the group-specific identification display Tb can be provided in a blue color of the density in accordance with the level value "3" on the track of movement of the player character 12B in the maze.

2-2) Second Movement Control Process

In the second movement control process, if the second character moves through the position with the group-specific identification display (the appearance position 111) in an overlapping manner, the group-specific identification display at the target identification display position is changed by a process related to the updating of the track level and the change of the display mode described below on the appearance position 111 as the target identification display position.

Figure 7:
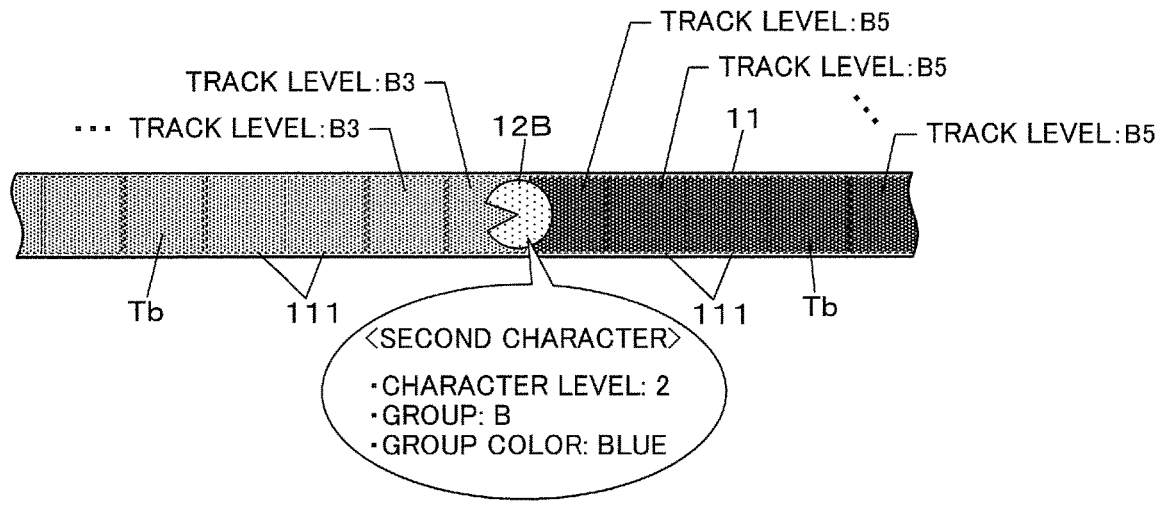
FIG. 7 is a diagram for describing a second movement control process.
Figure 8:
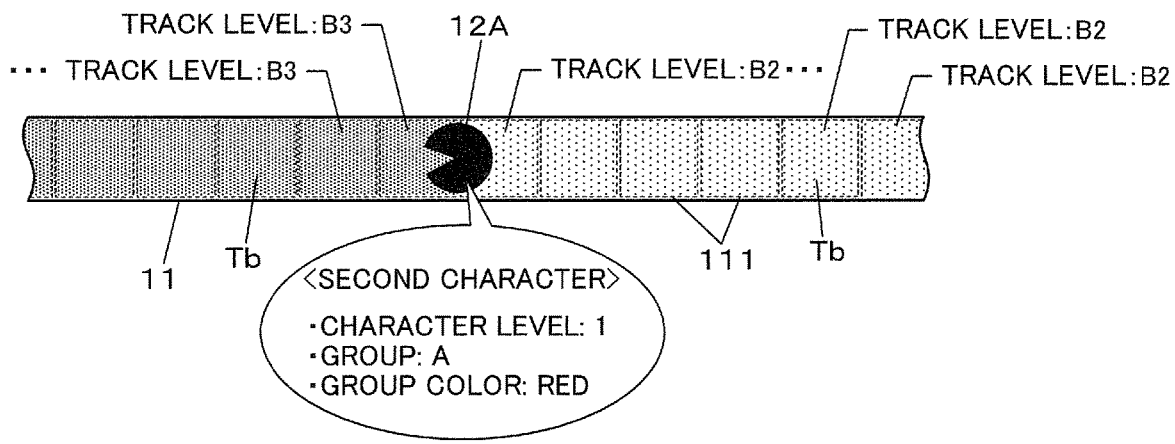
FIG. 8 is a diagram for describing a second movement control process.
Figure 9:
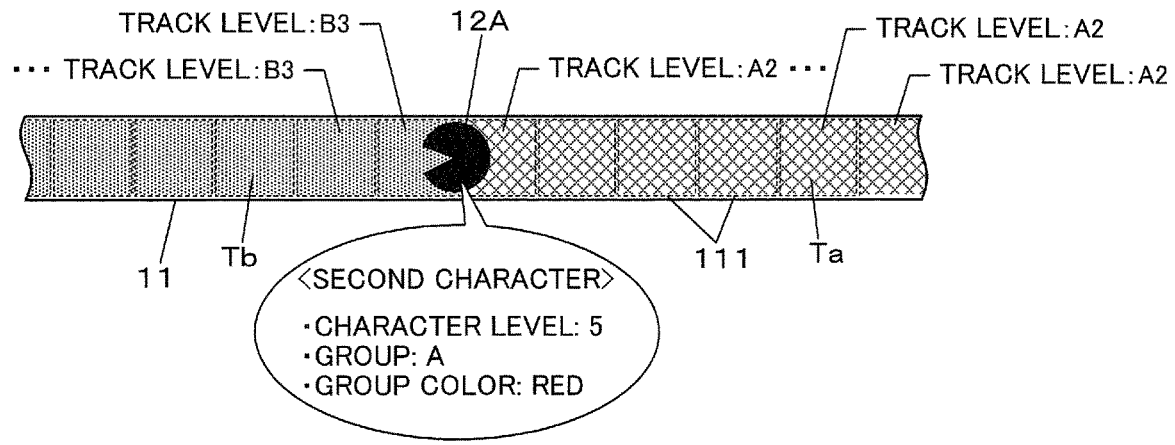
FIG. 9 is a diagram for describing a second movement control process.

In further detail, at that time, the display mode of the group-specific identification display is changed differently depending on whether the second character is a player character 12 in the same group as the first character (including the case where the player character 12 is identical to the first character) or the second character is a player character 12 in the opponent group. FIGS. 7 to 9 are diagrams for describing the second movement control process. FIG. 7 describes the details of the process in the case where the second character's group is the same as the first character's group (repeated movement control), and FIGS. 8 and 9 describe the details of the process in the case where the second character's group is different from the first character's group.

First, the track level of the target identification display position is updated based on the second character's group and character level. In the present embodiment, when the second character's group is the same as the first character's group and a character belonging to that group moves through the appearance position 111 with the group-specific identification display in an overlapping manner (repeated movement), a control is performed to raise the track level by adding the character level of the second character to the level value. In the example of FIG. 7, the player character 12B with the character level "2" in the group B moves through the appearance positions 111 with the group-specific identification display Tb at the track level "B3". Therefore, in the second movement control process, the track level of the appearance positions 111 through which the character has moved is updated and raised to "B5".

On the other hand, when the second character's group is different from the first character's group, a control is performed to lower the track level by subtracting the character level from the level value of the original track level. In the example of FIG. 8, the player character 12A with the character level "1" in the group A moves through the appearance positions 111 with the group-specific identification display Tb at the track level "B3". Therefore, in the second movement control process, the track level of the appearance positions 111 through which the character has moved is updated and lowered to "B2". When the character level of the second character is equal to or higher than the level value of the track level, the difference between them is set as the level value. Then, the group code is changed to indicate the second character's group to update the track level. In the example of FIG. 9, the player character 12A with the character level "5" in the group A moves through the appearance positions 111 with the group-specific identification display Tb at the track level "B3". Therefore, in the second movement control process, the group code of the track level at the appearance positions 111 through which the character has moved is changed from "B" to "A" and the track level is updated to "A2" where the level value is set to "2".

After the track level is updated, the display mode of the group-specific identification display is changed. Specifically, based on the updated track level, the display color is set in a manner similar to the manner of setting the display mode in the first movement control process. Then, the display mode of the group-specific identification display is changed by performing a control to display the squares at the target identification display positions in the display color.

For example, in the example of FIG. 7, as the level value of the track level increases due to the movement of the second character, the group-specific identification display Tb at the appearance positions 111 through which the second character has moved changes to a darker blue color. On the other hand, in the example of FIG. 8, as the level value of the track level decreases due to the movement of the second character, the group-specific identification display Tb at the appearance positions 111 through which the second character has moved changes to a lighter blue color. In the example of FIG. 9, since the group code of the track level due to the movement of the second character has changed to indicate the second character's group, the group-specific identification display at the appearance positions 111 through which the second character has moved changes from the blue group-specific identification display Tb to the red group-specific identification display Ta.

According to the track display control process, by raising the character level of their own player character 12, the player can provide the group-specific identification display with a high track level (large level value) on the track of the movement. Even when their own player character level is low, the player can raise the track level by causing the player character to repetitively move through the positions with the group-specific identification display associated with the own group. On the other hand, the player can lower the track level of the opponent group by causing the own player character to move through the positions with the group-specific identification display associated with the opponent group. Then, the player can change the display mode of the group-specific identification display at the positions through which the character has moved to the display mode in accordance with the updated track level. Depending on the magnitude relationship between the level value of the track level and the character level of the first character, the player can change the group code of the track level to indicate the own group, thereby to change the group-specific identification display associated with the opponent group to the group-specific identification display associated with the own group.

The change quantity of the track level (level value change quantity) may not be the character level itself. For example, the correspondence relation between the character level and the level value change quantity may be predetermined. Then, the level value change quantity may be calculated in accordance with the level value of the track level and the change quantity corresponding to the level difference between the first character and the second character that have moved through, thereby to determine or update the track level.

When the level value of the track level becomes "0", the group-specific identification display at the target identification display positions may be erased. In that case, the display at the relevant appearance positions 111 returns to the display of the passage 11 with no group-specific identification display.

The display mode of the group-specific identification display is not limited to the above-described combination of color and density but can be set differently as appropriate. For example, a plurality of display patterns (designs) by track level may be prepared such as that a natural grass field is designed for low track levels and a developed crop field is designed for high track levels. The display mode may be changed such that separate sets are assigned to the competing groups to provide the group-specific identification displays.

Alternatively, the thickness of the group-specific identification display may be set to be variable in accordance with the track level. For example, the thicknesses (widths) of the belt-like group-specific identification displays Ta and Tb illustrated in FIG. 4 and others may be greater as the track level is higher and may be smaller as the track level is lower.

Otherwise, a predetermined parameter value may be set at each position in the game space where the player characters 12 are movable so that the change quantity can be adjusted in accordance with the parameter value. For example, in a game where player characters are set with attributes, values of compatibility with the various character attributes may be predetermined at each position in the game space. The change quantity is adjusted taking into account the degree of compatibility between the moving player character and the position through which the player character has moved. For example, the change quantity may be increased as the value of compatibility with the character attributes is higher, and may be decreased as the value of the compatibility is lower.

3) Lifetime Control Process

In the lifetime control process, the erase timing of the group-specific identification display at each appearance position 111 with the group-specific identification display is set to manage the lifetime of the group-specific identification display at the appearance position 111.

In the present embodiment, a predetermined lifetime period is preset to set the erase timing. The lifetime period may be set to a fixed value that is uniformly applied or may be set to stepwise values in accordance with the track level. The lifetime period may be more lengthened as the track level is higher, or may be more shortened as the track level is lower.

In the lifetime control process, when the group-specific identification display is provided by the first movement control process, the erase timing at the appearance position 111 that is the target movement appearance position is set as a timing after a lapse of the lifetime period from the point in time when the group-specific identification display is provided. When the second character has moved through the appearance position 111 with the group-specific identification display in an overlapping manner, the erase timing is updated to lengthen the lifetime. That is, when the display mode of the group-specific identification display is changed by the second movement control process, the erase timing at the appearance position 111 that is the target identification display position is updated from the point in time of the change to a timing after a lapse of the lifetime period.

After that, the coming of the preset erase timing is monitored, and then when the erase timing has come at any appearance position 111, a control is performed to erase the group-specific identification display at the appearance position 111. This control causes the display at the appearance position 111 to return to the display of the passage 11 with no group-specific identification display.

According to this lifetime control process, the group-specific identification display is erased upon a lapse of the lifetime period without the passing of any player character 12. On the other hand, the erase timing is delayed and set again upon passing of a player character 12. Thus, the player can cause the player character 12 to move through the position with the group-specific identification display, thereby maintaining the position in the state with the group-specific identification display.

4) Item Appearance Control Process

In the item appearance control process, first, for the appearance positions 111 with the group-specific identification display and the appearance positions 111 with the display mode of the group-specific identification display changed, the appearance conditions in accordance with the track levels of the appearance positions 111 are set as applied appearance conditions.

To that end, in the present embodiment, the appearance conditions for the predetermined track levels are determined. FIG. 10 is a diagram illustrating an example of a data configuration of level-specific appearance condition data 523 that defines level-specific appearance conditions. As illustrated in FIG. 10, the level-specific appearance condition data 523 is prepared for each track level 524, and is set with correspondence relations among appearance position number, appearance condition, acquisition condition, and unit scoring points. The appearance condition is set with appearance item type and appearance timing.

These entries are set in a manner similar to the manner of setting the initial appearance condition data 521. However, the appearance timing in the level-specific appearance condition data 523 is set by a length of time from when a player character 12 moves through the appearance position 111 to when the item of the corresponding appearance item type is caused to appear.

The details of these entries are preferably set such that, as the track level 524 is higher, the player character 12 having moved through the appearance position 111, the player character 12 having moved through the appearance position 111 in an overlapping manner, the player character 12 having acquired the item appearing at the appearance position 111, or the group to which any of the player characters 12 as listed above belongs can have an advantage in many cases. For example, the level-specific appearance condition data 523 is set in accordance with the track level 524 such that the unit scoring points of the cookie 14 and the fruit 16 are increased as the track level 524 is higher, the appearance positions 111 of the power cookie 15 and fruit 16 of the appearance item types are increased as the track level 524 is higher, or the length of time set for the appearance timing is more shortened as the track level 524 is higher (new items are caused to appear in a short time). The power cookies 15 with different weakening times may be prepared to increase the appearance positions 111 of the power cookie 15 of which the weakening time is longer as the track level 524 is higher.

As the appearance item types, special items different from the cookie 14, the power cookie 15, and the fruit 16 may be set. Examples of the special items include: various buildup items and recovery items for the player characters 12; an item that, when being acquired, erases all the group-specific identification displays; an item that erases only the group-specific identification display associated with the opponent group against the player character 12 having acquired the item; an item that provides a predetermined number of new player characters (remaining lives) to the player operating the player character 12 having acquired the item or another player in the same group as the player of the player character 12 having acquired the item; and others.

The settings of the acquisition conditions for the cookie 14 and the power cookie 15 may include settings for limiting the player characters 12 who can acquire the cookie 14 and the power cookie 15 (for example, see record R21). Specifically, the player characters 12 who can acquire the item can be set to the casual characters and the player characters 12 belonging to the same group as the casual characters. Alternatively, the acquisition conditions may include a setting that only the player characters 12 having moved through the appearance position 111 before a lapse of the appearance timing since the provision of the group-specific identification display to the appearance position 111 can acquire the item.

The casual character refers to a character that have caused the group-specific identification display to be provided at the appearance position 111 (that is, the first character) or a character that has finally caused the group-specific identification display to reach the current track level (that is, the player character 12 that has finally moved through the appearance position 111 as the second character). Whether both of the characters are set as casual characters or whether either of them is set as a casual character can be set as appropriate. In the following description, both are set as casual characters.

Therefore, in the case of record R21, for example, when the group-specific identification display is provided at the appearance position 111 due to the movement of the first character, a control in the item appearance control process is performed to cause the power cookie 15 to appear upon lapse of a time of length T23 in accordance with the appearance condition. The player characters 12 allowed to acquire the power cookie 15 thus caused to appear are limited to the casual characters by the subsequent item acquisition control process.

Then, in the item appearance control process, the applied appearance condition is set in accordance with the level-specific appearance condition data 523. Specifically, for the appearance position 111 where the player character 12 has been caused to acquire the item by the item acquisition control process (that is also the appearance position provided with the group-specific identification display by the first movement control process), the applied appearance condition is set in accordance with the track level. In addition, for the appearance position 111 with the group-specific identification display changed by the second movement control process, the applied appearance condition is set again based on the track level updated due to the change. After that, the item appearance control is performed in accordance with the applied appearance conditions. That is, upon coming of the appearance timing, the item of the appearance item type is arranged and caused to appear at the appearance position 111.

5) Item Acquisition Control Process

In the present embodiment, prior to the beginning of the game, the items are arranged at the appearance positions 111. During the game, the applied appearance conditions are set for the appearance positions 111 upon movement or overlapping movement of the player characters 12, and the items are caused to appear at the appearance positions 111 in accordance with the applied appearance conditions. Then, in the item acquisition control process, as described above, when a player character 12 has moved through the appearance position 111 with an item arranged, a control is performed to cause the player character 12 having moved through to acquire the item at the appearance position 111. If there is a limitation on the player characters 12 that can acquire the item at the appearance position 111 as an acquisition condition associated with the item, when the player character 12 having moved through satisfies the acquisition condition, the player character 12 is caused to acquire the item.

6) Score Calculation Process

The score calculation process includes: a first score calculation process by which to calculate the player-specific scores by adding scoring points in accordance with item acquisition during the game and add up the player-specific scores by group to determine the group-specific scores; and a second score calculation process by which to add scoring points in accordance with the sizes (areas) of the group-specific identification displays at the end of the game to calculate the final group-specific scores.

6-1) First Score Calculation Process

In the first score calculation process, during the game, the player-specific scores are calculated or updated as needed in the manner described above. That is, when the cookie 14 or the fruit 16 with the determined unit scoring points is acquired by a player character 12, the unit scoring points are added to the player-specific score of the player operating the player character 12. In addition, when one player character 12 defeats a disturbance character 13 or a player character 12 in the opponent group, scoring points are added to the player-specific score of the player operating the player character 12.

6-2) Second Score Calculation Process

In the second score calculation process, the respective final group-specific scores of the groups are calculated based on the sizes (areas) of the group-specific identification displays of the groups at the end of the game. In the present embodiment, the correspondence relation between the size of the group-specific identification display and the scoring points (a size-specific scoring point conversion table) is preset. At the end of the game, the sizes of the group-specific identification displays associated with the groups are determined by counting the number of the appearance positions 111 with the group-specific identification display by group code, for example. After that, with reference to the size-specific scoring point conversion table, the scoring points are added to the group-specific scores of the groups in accordance with the sizes of the group-specific identification displays to determine the final group-specific scores of the groups.

The size ratio between the groups may be determined from the sizes of the group-specific identification displays. Then, the scoring points may be added in accordance with the determined ratio to calculate the final group-specific scores of the groups. In that case, the correspondence relation between the ratio and the scoring points may be predetermined. Predetermined scoring points may be added to only the group with the larger size of the group-specific identification display or the higher ratio.

The second score calculation process may be performed at a predetermined timing during the game, in addition to or instead of at the end of the game. The timing during the game can be set as appropriate. For example, the timing during the game can be a timing when an elapsed time from the beginning of the game has reached a predetermined time period or a timing when all initially arranged items have been acquired. Alternatively, the timing during the game can be a timing when a specific item has been acquired. In that case, the item may be the fruit 16 or the like, or a special item that, when being acquired, causes the second score calculation process to be performed may be prepared. In the latter case, the player can seek a large amount of scoring points by acquiring the special item when the group-specific identification display of the own group is provided in a wide area. The setting for appearance of the special item is included in any of the level-specific appearance condition data 523 so that the appearance control of the special item can be performed as appropriate during the game.

In summary, in the present embodiment, prior to the beginning of the game, the items are arranged at the appearance positions 111 in accordance with the appearance conditions associated with the initial arrangement. The applied appearance conditions are set as needed at the movement positions and overlapping movement positions of the player characters 12, and the items are arranged and caused to appear in accordance with the set applied appearance conditions. When a player character 12 has moved through the appearance positions 111 where the items are arranged, the player character 12 is allowed to acquire the items at the appearance positions 111 and the group-specific identification display is provided on the track of movement of the player character 12. When a player character 12 has moved through the appearance positions 111 with the group-specific identification display in an overlapping manner, the display mode of the group-specific identification display is changed, and the group-specific identification display of which lifetime has elapsed without the passing of any player character 12 is erased. The group-specific scores are calculated by addition of scoring points in accordance with item acquisition during the game and addition of scoring points in accordance with the sizes of group-specific identification displays of the groups at the end of the game.

Functional Configuration

1. Server System

Figure 11:
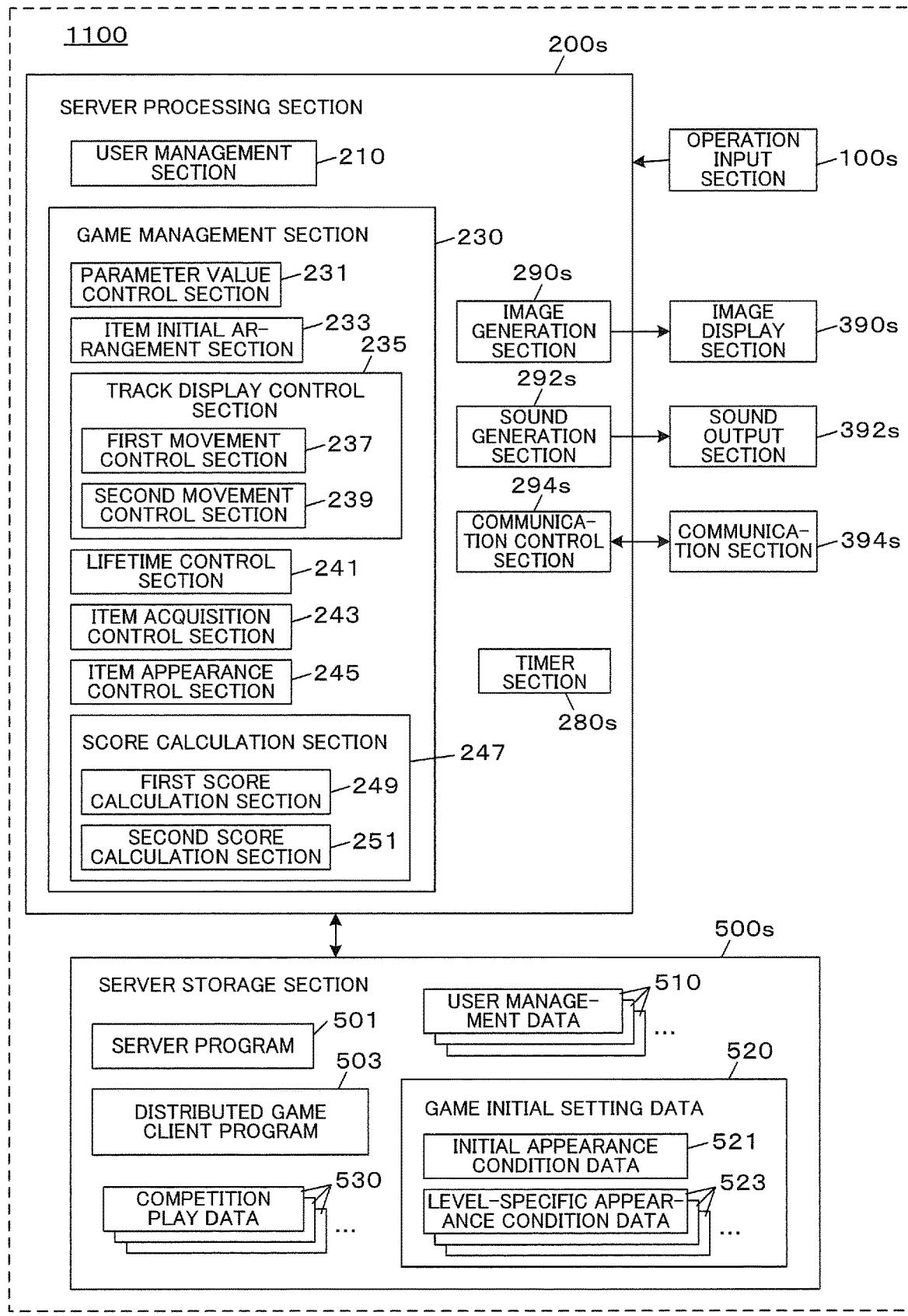
FIG. 11 is a block diagram illustrating an example of a functional configuration of a server system.

FIG. 11 is a block diagram illustrating an example of a functional configuration of the server system 1100. As illustrated in FIG. 11, the server system 1100 in accordance with the present embodiment includes an operation input section 100s, a server processing section 200s, an image display section 390s, a sound output section 392s, a communication section 394s, and a server storage section 500s.

The operation input section 100s is a means for inputting various operations for system management and maintenance, and is implemented by, for example, a keyboard, a mouse, or a touch panel. The operation input section 100s corresponds to the keyboard 1106 and the touch panel 1108 illustrated in FIG. 1.

The server processing section 200s is implemented, for example, by a processor including an arithmetic circuit such as a CPU, a GPU, an ASIC, or an FPGA and an electronic component such as an IC memory. The server processing section 200s controls input/output of data between the device sections including the operation input section 100s and the server storage section 500s. The server processing section 200s performs various calculation processes based on a predetermined program, data, an operation input signal from the operation input section 100s, and data received from the player terminal 1500 to integrally control the operation of the server system 1100. The server processing section 200s corresponds to the control board 1150 and the CPU 1151 thereon illustrated in FIG. 1.

The server processing section 200s includes a user management section 210, a game management section 230, a timer section 280s, an image generation section 290s, a sound generation section 292s, and a communication control section 294s.

The user management section 210 performs a process related to user registration and manages the data of each registered user (player) associated with a user account. For example, the user management section 210 can perform an issuing process of issuing a unique account to the registered user, a registration information management process of registering and managing personal information for each account, and a play history management process of managing a history of login and logout or the like. Of course, any other management processes for other data associated with the user account can be included as appropriate.

The game management section 230 performs various processes related to game execution management. In accordance with the present embodiment, a multi-play game is implemented as a client-server online game. Thus, the game management section 230 communicates with the player terminal 1500 to perform a control to provide data required for gameplay. In order to provide the data, the game management section 230 can perform processes in relation to a game progress control and a reflection of a game result including: 1) a matching process of players participating in the game; 2) a process of setting the game space by arranging background objects and items; 3) a process of disposing a player character in the game space and controlling behavior of the player character in accordance with the operation input through the player terminal 1500; 4) a process of disposing and controlling a virtual camera in the game space; 5) a process of disposing the disturbance characters in the game space and automatically controlling behavior of the disturbance characters; 6) a process of determining contact and acquisition of the player characters, the disturbance characters, and the items and for reflecting the determinations; 7) a progress control of the game based on the results of item acquisition by the characters; 8) a process of generating an image of the game space as seen from the virtual camera as a game image; and 9) a determination process of determining whether a termination condition of the game is satisfied. Accordingly, the game management section 230 can also store various types of data required for controlling the gameplay in the server storage section 500s.

The game management section 230 includes a parameter value control section 231, an item initial arrangement section 233, a track display control section 235, a lifetime control section 241, an item acquisition control section 243, an item appearance control section 245, and a score calculation section 247.

The parameter value control section 231 performs a parameter value control process of changing respective parameter values of the player characters operated by the players based on the play status of the player characters during the game. In the present embodiment, the number of acquired cookies that are items acquirable by the player characters during the game is counted, for example, for each player, and the character levels of the players are set or updated as necessary in accordance with a predetermined level conversion table. The updating of the character levels can be said to be one of game progress controls.

The item initial arrangement section 233 is a functional section that performs the item initial arrangement process prior to the beginning of the game. The item initial arrangement section 233 refers to the initial appearance condition data 521 and arranges the items at the appearance positions in accordance with the appearance conditions.

The track display control section 235 is a functional section that performs the track display control process. The track display control section 235 provides a predetermined identification display (in the present embodiment, the group-specific identification display) on the track of movement of a character participating in the competition (in the present embodiment, the player character). The track display control section 235 includes a first movement control section 237 that performs a first movement control process and a second movement control section 239 that performs a second movement control process.

The first movement control section 237 performs a control to provide the track of movement of the first character with the group-specific identification display of the display mode by which the group of the first character is identifiable and that corresponds to the character level. At that time, the first movement control section 237 determines the track level of the movement position from the first character's group and character level. On the other hand, when the second character has moved through the position with the group-specific identification display in an overlapping manner, the second movement control section 239 changes the display mode at the overlapping movement position with the group-specific identification display, based on the second character's group and character level. At that time, the second movement control section 239 updates the track level at the overlapping position, based on the second character's group and character level.

The lifetime control section 241 is a functional section that performs the lifetime control process. The lifetime control section 241 performs a control to set the erase timing for the appearance position with the group-specific identification display and erase the group-specific identification display from the appearance position where the erase timing has come.

The item acquisition control section 243 is a functional section that performs the item acquisition control process. The item acquisition control section 243 performs a control to allow the player character having moved through the appearance position where an item is arranged to acquire the item.

The item appearance control section 245 is a functional section that performs the item appearance control process during the game. The item appearance control section 245 causes an item to appear at the appearance position where a player character has moved or has moved in an overlapping manner. Specifically, the item appearance control section 245 performs the item appearance control by referring to the level-specific appearance condition data 523 in accordance with the track level of the appearance position and setting the applied appearance condition for the relevant appearance position.

The score calculation section 247 is a functional section that performs the score calculation process. The score calculation section 247 calculates group-specific scores 553 of the groups based on at least the items acquired by the player characters. The score calculation section 247 includes a first score calculation section 249 that performs the first score calculation process and a second score calculation section 251 that performs the second score calculation process.

The first score calculation section 249 calculates and updates the player-specific scores 563 of the players as necessary in accordance with the item acquisition by the player characters during the game, and calculates and updates the group-specific scores 553 by adding up the player-specific scores 563 on a group-by-group basis. On the other hand, the second score calculation section 251 determines the sizes of the group-specific identification displays of the groups at the end of the game, and calculates the final group-specific scores 553 of the groups in accordance with the determined sizes.

The timer section 280s uses a system clock to measure the current date and time, a limited time period, and others.

The image generation section 290s generates images related to the system management of the server system 1100 or the like, and outputs the resultant to the image display section 390s.

The sound generation section 292s is implemented by execution of an IC or software for generating sound data and decoding, and generates or decodes sound data of operational sounds related to the system management of the server system 1100 and video distribution, and a back ground music (BGM), for example. Sound signals related to the system management are output to the sound output section 392s.

The communication control section 294s performs a communication connection and data process of data communication with an external device (e.g., the player terminal 1500) through the communication section 394s, and implements exchange of data with the external device.

The image display section 390s displays various screens for the system management based on the image signals input from the image generation section 290s. For example, the image display section 390s can be implemented by an image display device, such as a flat panel display, a projector, or a head-mounted display. The image display section 390s corresponds to the touch panel 1108 illustrated in FIG. 1.

The sound output section 392s receives the sound signals input from the sound generation section 292s to emit the corresponding sounds. The sound output section 392s corresponds to a speaker (not illustrated) included in the main body device 1101 or the touch panel 1108 in FIG. 1.

The communication section 394s connects to the network N to implement communication. For example, the communication section 394s can be implemented by a transceiver, a modem, a terminal adaptor (TA), a jack for wired communication cable, a control circuit, or the like. The communication section 394s corresponds to the communication device 1153 illustrated in FIG. 1.

The server storage section 500s stores programs for causing the server system 1100 to operate to implement various functions included in the server system 1100 and data used during execution of the programs. The programs and the data are stored previously or temporarily at every process. For example, the server storage section 500s can be implemented by an IC memory such as a RAM or a ROM, a magnetic disc such as a hard disc, or an optical disc such as a compact disc read-only memory (CD-ROM) or a digital versatile disc (DVD). The server storage section 500s corresponds to the IC memory 1152 and the storage 1140 illustrated in FIG. 1.

Moreover, the server storage section 500s stores a server program 501, a distributed game client program 503, user management data 510, game initial setting data 520, and competition play data 530. In addition, the server storage section 500s stores necessary data such as a timer, a counter, various tables and thresholds, and flags as appropriate.

The server program 501 is a program for causing the server processing section 200s to function as the user management section 210 and the game management section 230. The server program 501 may include programs for causing the server processing section 200s to function as the image generation section 290s, the sound generation section 292s, and the communication control section 294s as appropriate.

The distributed game client program 503 is an original of a game client program 502 (see FIG. 11) downloaded to the player terminal 1500.

The user management data 510 is prepared for each player who has registered as a user, and includes various types of data for management related to the gameplay of the player including a player ID (an account), a play history, or the like.

The game initial setting data 520 includes various types of initial setting data necessary for executing the game. For example, the game initial setting data 520 includes the initial appearance condition data 521 (see FIG. 5) and the level-specific appearance condition data 523 (see FIG. 10). Besides, the game initial setting data 520 includes initial setting data associated with game stages such as map data, initial setting data associated with player characters such as model data of the player characters, motion data to be used for motion control of the player characters, initial values of state parameters, and setting values of moving speed parameters, and initial setting data associated with disturbance characters such as model data of the disturbance characters, and operation pattern data defining the pursuing movement patterns of the disturbance characters.

Figure 12:
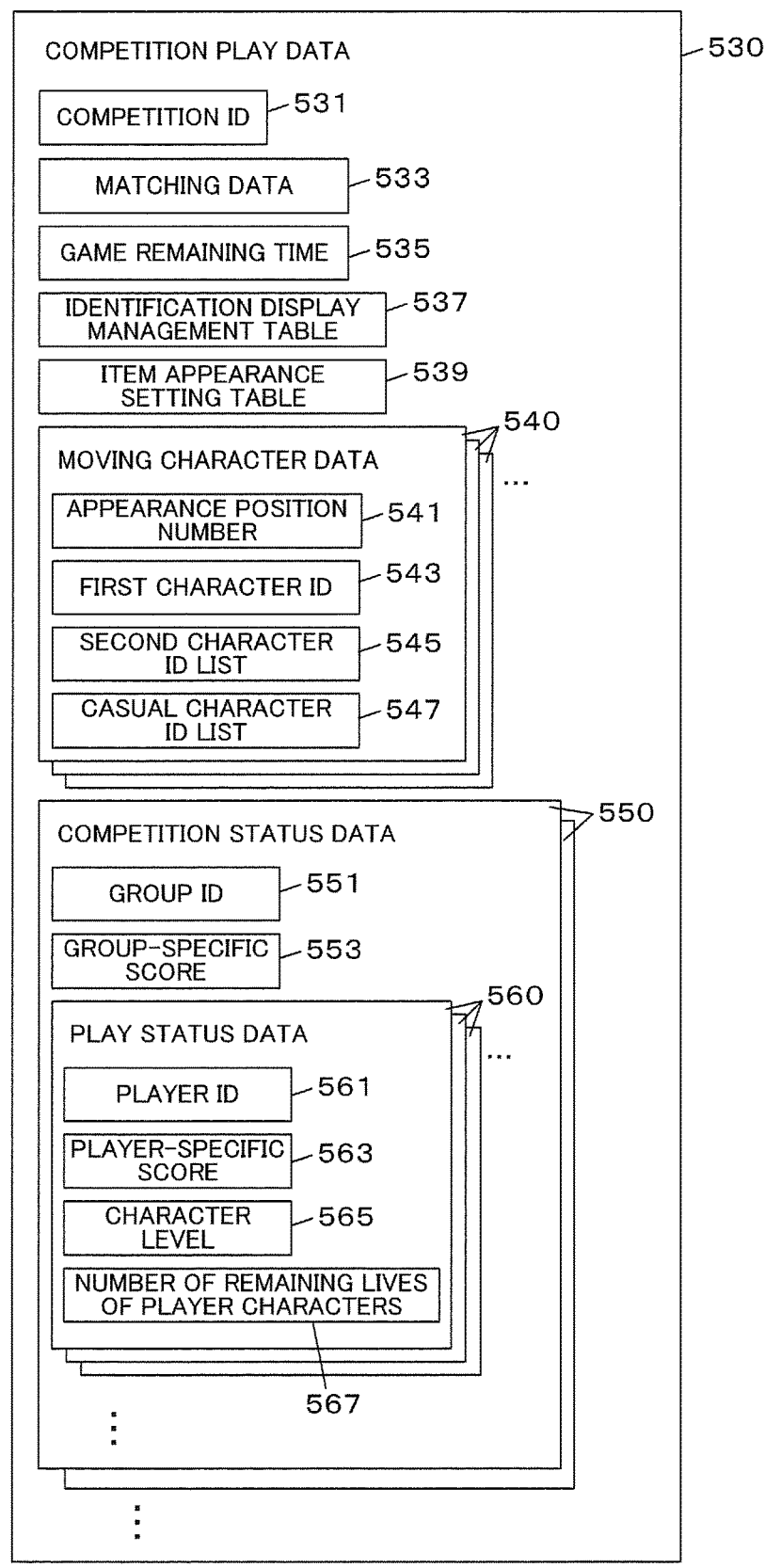
FIG. 12 is a diagram illustrating an example of a data configuration of competition play data.

The competition play data 530 is prepared for each competition game and includes various types of data describing the players participating in the competition game and the progress status of the game. For example, as illustrated in FIG. 12, one competition play data 530 includes a competition ID 531, matching data 533, game remaining time 535 associated with the competition game, an identification display management table 537, an item appearance setting table 539, moving character data 540, and competition status data 550.

The matching data 533 includes data of the players participating in the game. For example, the matching data 533 includes an account and a player name of each player, and a device ID of the player terminal 1500 used by each player.

The identification display management table 537 is for management of group-specific identification displays at the appearance positions. For example, as illustrated in FIG. 13, the identification display management table 537 is set with an identification display flag indicating the presence or absence of group-specific identification display (presence: ON/absence: OFF), the current track level, and the erase timing in association with appearance position numbers.

The identification display flag is turned ON when a group-specific identification display is provided at the corresponding appearance position by the first movement control section 237, and is turned OFF when the group-specific identification display is erased from the corresponding appearance position by the lifetime control section 241. The current track level refers to the track level that is determined by the first movement control section 237 and updated by the second movement control section 239. The erase timing refers to the erase timing that is set and updated by the lifetime control section 241.

Returning to FIG. 12, the item appearance setting table 539 stores the appearance settings of the items at the appearance positions. For example, as illustrated in FIG. 14, the item appearance setting table 539 is set with an appearance flag indicating the presence or absence of an item arranged (presence: ON/absence: OFF), the applied appearance conditions, the applied acquisition conditions, and the applied unit scoring points in association with the appearance position numbers. The item appearance setting table 539 is generated by the item initial arrangement section 233, and is updated as needed by the item appearance control section 245.

Specifically, first, in order to arrange the items at the beginning of the game, the item initial arrangement section 233 reads the appearance conditions from the initial appearance condition data 521 and sets the same as the applied appearance conditions at the appearance positions, reads the acquisition conditions and sets the same as the applied acquisition conditions at the appearance positions, and reads the unit scoring points and sets the same as the applied unit scoring points at the appearance positions. Then, the item initial arrangement section 233 turns ON the appearance flag for the appearance positions where the appearance timing is "the beginning of the game" to generate the item appearance setting table 539. After that, the item initial arrangement section 233 arranges the items of the appearance item types corresponding to the appearance positions of which the appearance flag is ON. The item initial arrangement section 233 monitors the coming of the appearance timing for the appearance position of which the appearance flag is OFF, and upon coming of the appearance timing, causes the corresponding item (the fruit in the present embodiment) to appear at the appearance position.

Next, in order to set the applied appearance condition, the item appearance control section 245 updates the appearance flag for the target appearance position (the appearance position where the item acquisition control section 243 has caused the player character to acquire the item) to OFF. Then, the item appearance control section 245 refers to the level-specific appearance condition data 523 for the relevant track level, reads the appearance condition for the appearance position, and updates the applied appearance condition for the appearance position. At that time, the appearance timing in the applied appearance condition is set as a timing when the read length of time has elapsed since a point in time when the item was acquired. The item appearance control section 245 reads the acquisition condition at the appearance position and updates the applied acquisition condition for the appearance position, and reads the unit scoring points at the appearance position and updates the applied unit scoring points at the appearance position.

In order to re-set the applied appearance condition, the item appearance control section 245 refers to the level-specific appearance condition data 523 for the relevant track level, reads the appearance condition for the target appearance position (the appearance position through which the second character has moved in an overlapping manner) and updates the applied appearance condition for the appearance position, reads the acquisition condition for the appearance position and updates the applied acquisition condition for the appearance position, and reads the unit scoring points for the appearance position and updates the applied unit scoring points for the appearance position.

On the other hand, in order to cause a player character having moved through an appearance position to acquire the item, the item acquisition control section 243 performs a control to determine whether there is a match with the applied acquisition condition for the appearance position, and when determining that there is a match, cause the player character to acquire the item. In order to add scoring points in accordance with the item acquisition, the first score calculation section 249 adds the applied unit scoring points for the appearance position to calculate the player-specific score 563.

Returning to FIG. 12, the moving character data 540 is prepared for each appearance position and stores the movement histories of the player characters at the relevant appearance position. For example, one moving character data 540 includes an appearance position number 541, a first character ID 543, a second character ID list 545, and a casual character ID list 547. The first character ID 543 has registered the character ID of the player character having moved through the appearance position as the first character. The second character ID list 545 has additionally registered the character IDs of the player characters having moved through the appearance position as second characters in an overlapping manner in the order of movement. The casual character ID list 547 has registered the character ID of the first character and the character ID of the player character having finally moved through the appearance position as a second character.

In the present embodiment, at the time of provision of a group-specific identification display, the first movement control section 237 registers the character ID of the first character in the first character ID 543 of the moving character data 540 associated with the appearance position, and registers the character ID in the casual character ID list 547 as a casual character storage control means. In the present embodiment, at the time of changing of the display mode of the group-specific identification display, the second movement control section 239 registers and adds the character ID of the second character to the second character ID list 545 of the moving character data 540 associated with the appearance position, and adds the character ID to the casual character ID list 547 as a casual character storage control means. When the character ID of any second character having previously moved is registered, the second movement control section 239 deletes the previous character ID and then adds the same to the casual character ID list 547. When the lifetime control section 241 erases the group-specific identification display, the settings of the moving character data 540 associated with the appearance position are cleared.

The competition status data 550 is prepared for each group competing in the game and stores various kinds of data describing the competition status. For example, one competition status data 550 stores a group ID 551 of the group, a group-specific score 553 of the group, and play status data 560 of each player character in the group.

The play status data 560 includes a player ID 561 of the player operating the player character, a player-specific score 563 of the player, a character level 565, and the number of remaining lives of player characters 567. In addition, the play status data 560 can also include the numbers of various items acquired such as the cookie as appropriate.

2. Player Terminal

Figure 15:
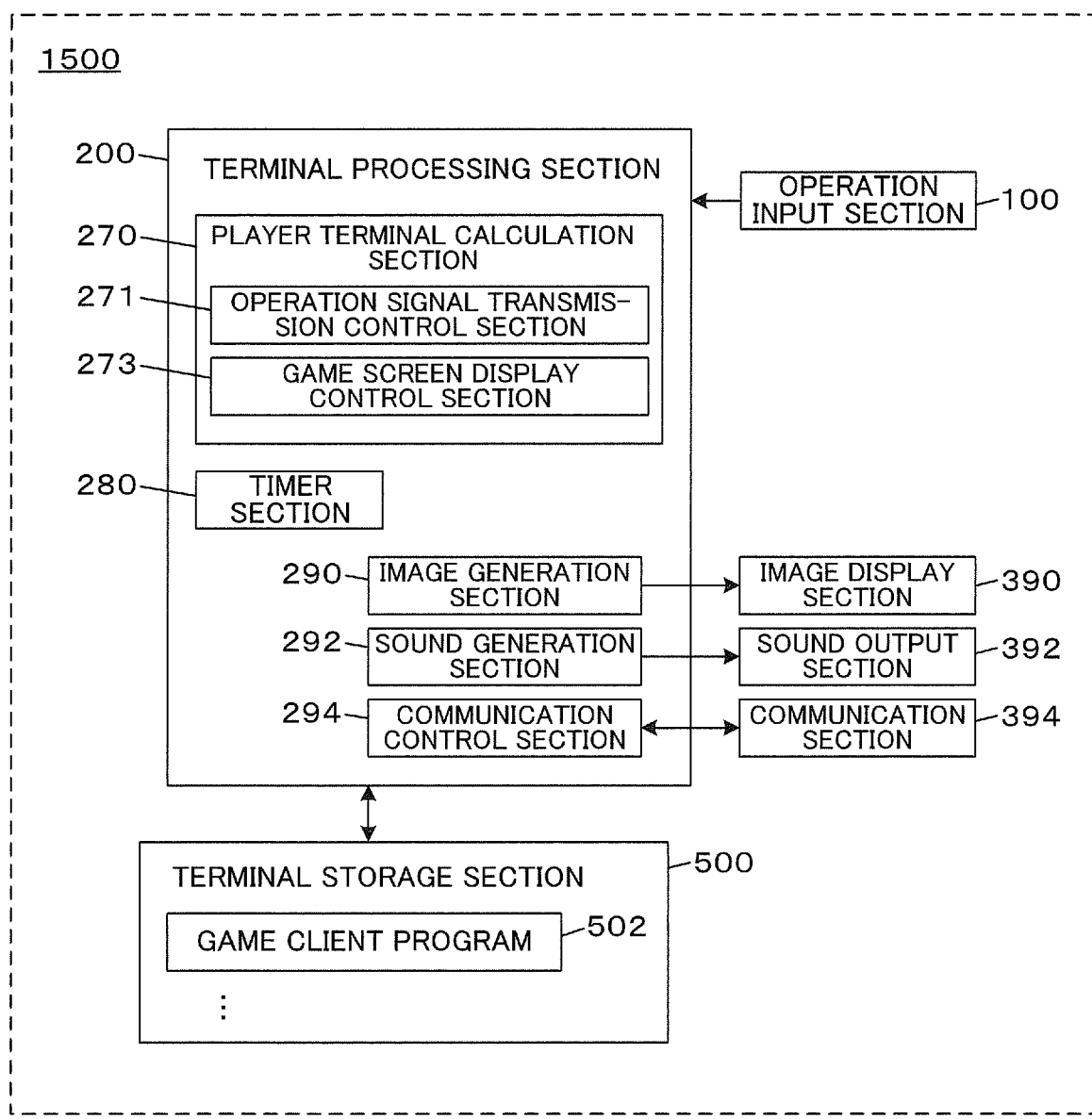
FIG. 15 is a block diagram illustrating an example of a functional configuration of the player terminal.

FIG. 15 is a block diagram illustrating an example of a functional configuration of the player terminal 1500. As illustrated in FIG. 15, the player terminal 1500 includes an operation input section 100, a terminal processing section 200, an image display section 390, a sound output section 392, a communication section 394, and a terminal storage section 500.

The operation input section 100 is used by the player to input various operations, and can be implemented, for example, by a button switch, a joystick, a touch pad, a track ball, an accelerometer, a gyro sensor, or a charge coupled device (CCD) module. The operation input section 100 corresponds to the arrow key 1502, the home key 1504, and the touch panel 1506 illustrated in FIG. 2.

The terminal processing section 200 is implemented, for example, by a processor including an arithmetic circuit such as a CPU, a GPU, an ASIC, or an FPGA and an electronic component such as an IC memory. The terminal processing section 200 controls input/output of data between the device sections including the operation input section 100 and the terminal storage section 500. The terminal processing section 200 performs various calculation processes based on a predetermined program, data, an operation input signal from the operation input section 100, and data received from the server system 1100 to integrally control the operation of the player terminal 1500. The terminal processing section 200 corresponds to the control board 1550 and the CPU 1551 thereon illustrated in FIG. 2. The terminal processing section 200 in accordance with the present embodiment includes a player terminal calculation section 270, a timer section 280, an image generation section 290, a sound generation section 292, and a communication control section 294.

The player terminal calculation section 270 performs various calculation processes to make the player terminal 1500 function as a terminal for the gameplay of the player. For example, the player terminal calculation section 270 includes an operation signal transmission control section 271 and a game screen display control section 273.

The operation signal transmission control section 271 performs a process of transmitting various types of data and request information to the server system 1100 in accordance with an operation input performed on the operation input section 100.

The game screen display control section 273 performs a control for displaying a game screen based on various types of data received from the server system 1100. For example, when the online game in accordance with the present embodiment is implemented as a web game, the game screen display control section 273 can be implemented by a web technology that actively controls the screen display using Java (registered trademark) and Cascading Style Sheet (CSS) along with a hypertext markup language (HTML) with a web browser as a base, such as a plugin of Adobe (registered trademark) Flash. Any other methods may be employed, of course. Furthermore, the game space image serving as a base of the game screen (e.g., three-dimensional computer graphics [3DCG]) is generated in the server system 1100 in the configuration in accordance with the present embodiment. However, the game space image may be generated in the player terminal 1500. In such a case, the game screen display control section 273 is in charge of controlling an object disposed in a virtual three-dimensional space for generating a 3DCG.

The image generation section 290 cooperates with the game screen display control section 273 to generate an image signal for displaying one game screen in every frame time (e.g., 1/60th of a second) based on the various types of data received from the server system 1100, and to output the generated image signal of the game screen to the image display section 390. For example, the image generation section 290 can be implemented, for example, by a processor such as a GPU or a digital signal processor (DSP), a video signal IC, a program such as a video codec, or a drawing frame IC memory such as a frame buffer.

The sound generation section 292 is implemented, for example, by a processor such as a digital signal processor (DSP) or a sound synthesizing IC, or an audio codec for playing a sound file, and generates a sound signal for sound effects, a BGM, various types of operational sounds related to the game, and outputs the generated signal to the sound output section 392.

The communication control section 294 performs a communication connection and data process for data communication with an external device (e.g., the server system 1100) through the communication section 394, and implements exchange of data with the external device.

The image display section 390 displays various game images such as the game screen based on the image signals input from the image generation section 290. For example, the image display section 390 can be implemented by an image display device, such as a flat panel display, a projector, or a head-mounted display. The image display section 390 corresponds to the touch panel 1506 illustrated in FIG. 2.

The sound output section 392 emits sounds such as sound effects and a BGM related to the game, based on the sound signal input from the sound generation section 292. The sound output section 392 corresponds to the speaker 1510 illustrated in FIG. 2.

The communication section 394 connects to the network N to implement communication. For example, the communication section 394 can be implemented by a transceiver, a modem, a TA, a jack for wired communication cable, a control circuit, or the like. The communication section 394 corresponds to the wireless communication module 1553 illustrated in FIG. 2.

The terminal storage section 500 stores programs for causing the player terminal 1500 to operate to implement various functions included in the player terminal 1500 and data used during the execution of the programs. The programs and the data are stored previously or temporarily at every process. For example, the terminal storage section 500 can be implemented by an IC memory such as a RAM or a ROM, a magnetic disc such as a hard disc, or an optical disc such as a CD-ROM or a DVD. The terminal storage section 500 corresponds to the IC memory 1552 and the memory card 1540 illustrated in FIG. 2.

The terminal storage section 500 stores the game client program 502. The game client program 502 is a program for causing the terminal processing section 200 to function as the player terminal calculation section 270. The game client program 502 may be an exclusive client program or include a web browser program and a plugin that implements an interactive image display, depending on a technique and a method for implementing an online game. In accordance with the present embodiment, the game client program 502 is a copy of the distributed game client program 503 (see FIG. 11) provided from the server system 1100.

Flow of Process

Figure 16:
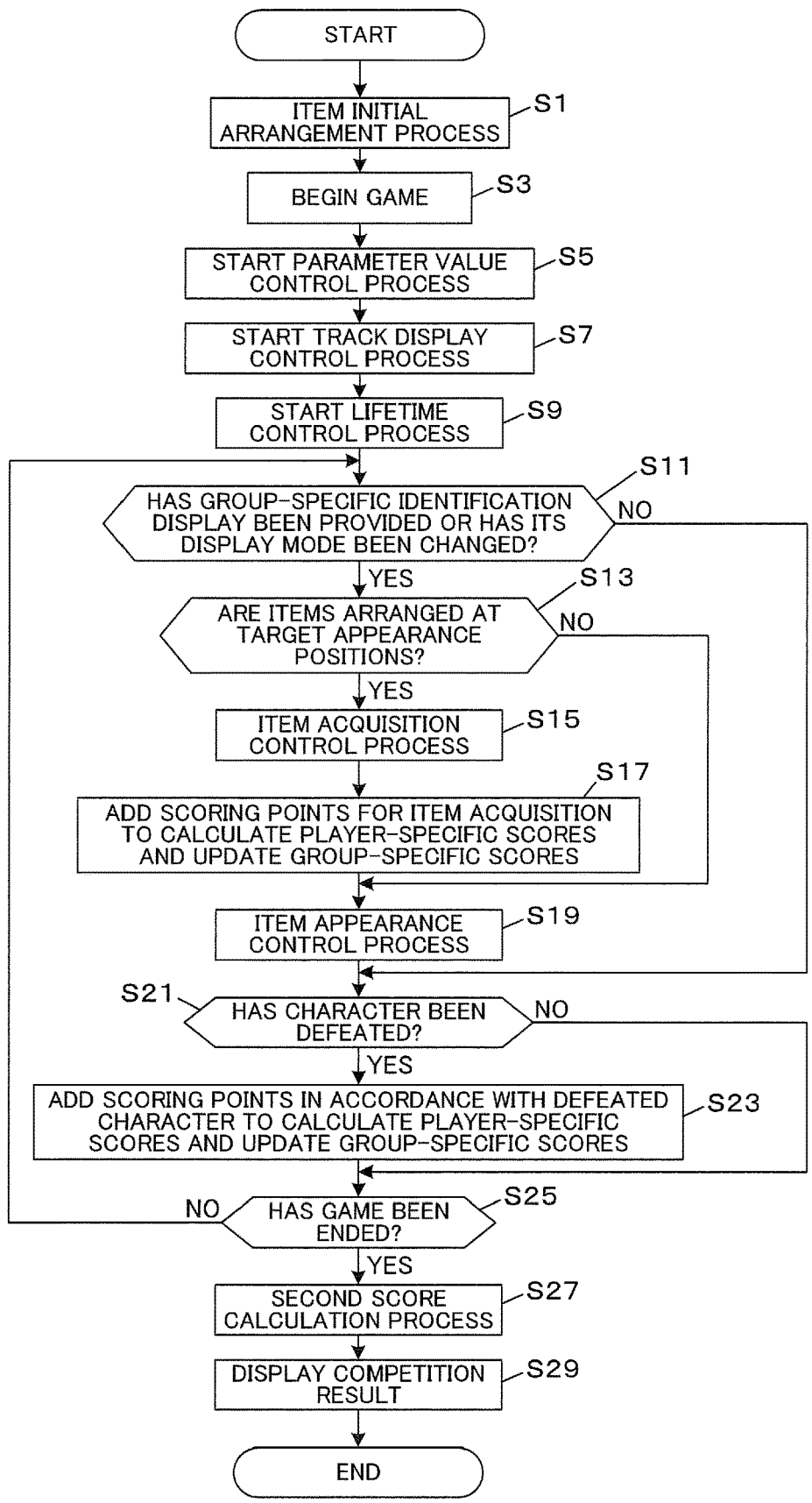
FIG. 16 is a flowchart for describing a flow of a process in the server system.

FIG. 16 is a flowchart for describing a flow of a process in the server system 1100 in accordance with the present embodiment, and shows a flow of a game process focusing on one game. The process as described herein is implemented by the server processing section 200s reading out and executing the server program 501. Assume that login procedures have been done separately with the player terminals 1500, and a group formation of the competing players has been done through the matching process.

First, prior to the beginning of the game, the item initial arrangement section 233 performs a control to generate the item appearance setting table 539 in accordance with the initial appearance condition data 521, and arrange the items at the appearance positions in the game space (step S1: the item initial arrangement process).

Then, upon beginning of the game (step S3), the parameter value control section 231 starts the parameter value control process (step S5). By the parameter value control process, the character levels 565 of the player characters operated by the players participating in the game are updated as needed in accordance with the play status.

The track display control section 235 starts the track display control process (step S7). Specifically, the first movement control section 237 performs a control to provide the group-specific identification display at the appearance positions along with the movement of the first character (the first movement control process), and the second movement control section 239 performs a change control on the display mode of the group-specific identification display at the appearance position through which the second character has moved in an overlapping manner (the second movement control process).

The lifetime control section 241 starts the lifetime control process (step S9). That is, the lifetime control section 241 performs a control to set and update the erase timing for the group-specific identification display provided by the track display control process started in the step S7 and erase the group-specific identification display in accordance with the erase timing.

Then, when the provision of the group-specific identification display or the change of its display mode have been performed by the track display control process started in the step S7 (step S11: YES), if the item is arranged at the target appearance position (step S13: YES), the item acquisition control section 243 performs the item acquisition control process to cause the player character having moved through the appearance position to acquire the item (step S15).

The first score calculation section 249 adds scoring points for the item acquisition to calculate the player-specific scores 563 and update the group-specific scores 553 (step S17).

Subsequently, the item appearance control section 245 performs a control to set (re-set) the applied appearance control for the target appearance position and cause the item to appear at the appearance position in accordance with the applied appearance condition (step S19: the item appearance control process). At that time, the item appearance control section 245 updates the appearance flag for the appearance position as appropriate and sets the applied acquisition condition and the applied unit scoring points, thereby updating the item appearance setting table 539.

During the game, when a player character of any player has defeated another character (step S21: YES), the first score calculation section 249 adds scoring points depending on whether the defeated character is a player character or a disturbance character to calculate the player-specific scores 563, and updates the group-specific scores 553 (step S23).

After that, the process returns to the step S11 until the end of the game (step S25: NO) to repeat the above-described processes. Then, at the end of the game (step S25: YES), the second score calculation section 251 performs the second score calculation process (step S27). That is, at the end of the game, the second score calculation section 251 determines the sizes of the group-specific identification displays on a group-by-group basis and adds scoring points in accordance with the determined sizes to calculate the final group-specific scores 553 of the groups. After that, the competition result is displayed (step S29), and then this process is terminated.

As described above, according to the present embodiment, the group-specific identification display can be provided on the track of movement of the first character in the display mode in accordance with its group and character level. When the second character has moved through the appearance position with the group-specific identification display in an overlapping manner, the display mode of the group-specific identification display can be changed based on its group and character level. More specifically, based on the group and character level of the player character having moved or having moved in an overlapping manner through the appearance position, the track level associated with the movement position can be determined or updated, and the display mode of the group-specific identification display can be set or changed in accordance with the track level.

While the item is caused to appear at the appearance position that is provided with the group-specific identification display under the appearance condition (the applied appearance condition) in accordance with the determined or updated track level, if there is no movement of any player character through the appearance position for the lifetime period after the provision of the group-specific identification display, the group-specific identification display can be erased.

Then, the group-specific scores of the groups can be calculated by adding scoring points in accordance with item acquisition and the like during the game and reflecting the sizes of the group-specific identification displays at the end of the game.

Therefore, in the game where players enjoy performing operations to move the characters, it is possible to achieve the technique for adding interest to the track of movement of characters. Since items are caused to appear on the track of movement of characters and acquired by characters having moved through the arrangement positions and then the game scores are calculated based on the items acquired by the characters, it is possible to achieve the game that provides the players with characteristic interest of gaining group-specific game scores through team play related to movement operations of the characters.

Note that the modes to which the present disclosure is applicable are not limited to the above-described embodiment, and the components can be added, omitted, or changed as appropriate.

Modification Example 1

In the above-described embodiment, the server system 1100 of the client-server game system 1000 is given as an example to which the present disclosure is applicable. However, this should not be construed in a limiting sense. For example, the present disclosure may be implemented by peer-to-peer connection among a plurality of player terminals 1500. In such a case, any one of the plurality of player terminals 1500 performs the functions of the server system 1100 in accordance with the above-described embodiment. Alternatively, the plurality of player terminals 1500 may share the functions of the game management section 230. Connecting the plurality of player terminals 1500 in such a manner constitutes a computer system.

Figure 17:
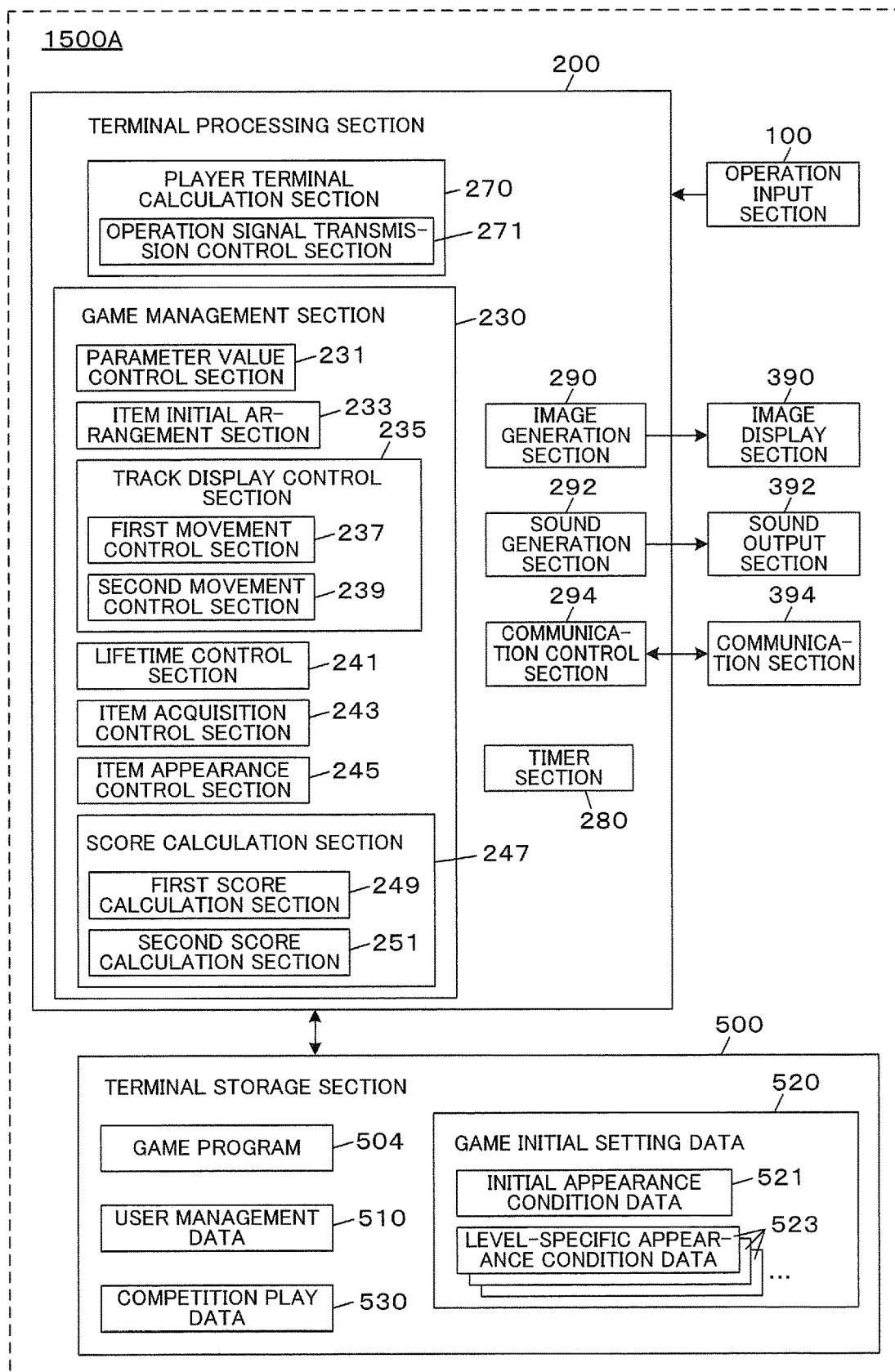
FIG. 17 is a diagram illustrating an example of a functional configuration of a player terminal in accordance with a modification example.

Specifically, FIG. 17 illustrates an example of a functional configuration of a player terminal 1500A sharing the functions of the server system 1100 in accordance with the above-described embodiment. In FIG. 17, common referential numerals are given to components similar to the components in the above-described embodiment. In this case, the server system 1100 mainly performs user registration, management of registration information, and matching, and provides the information in response to a request from the player terminal 1500A.

As illustrated in FIG. 17, in the player terminal 1500A in accordance with the present modification example, the terminal processing section 200 includes the game management section 230, and the game screen display control section 273 is omitted. That is, the player terminal 1500A in accordance with the present modification example does not acquire data for displaying an image of the game screen from the server system 1100, but the game management section 230 of the player terminal itself performs the process related to the game management to control the game progress, and generates the image of the game screen. The terminal storage section 500 of this player terminal 1500A stores a game program 504 for causing the terminal processing section 200 to function as the player terminal calculation section 270 and the game management section 230. The terminal storage section 500 also includes the user management data 510 related to the player using the player terminal 1500A, the competition play data 530 related to the gameplay that the player participates in, and the game initial setting data 520.

Flows of the processes performed by the player terminal 1500A in accordance with the present modification example are basically the same as the flows illustrated in the flowcharts in FIG. 16. You may read that the game management section 230 of the player terminal 1500A performs the steps.

The present modification example can provide the same advantageous effects as those in the above-described embodiment. The player terminal 1500 may be partially in charge of the functions of the game management section 230, instead of being entirely in charge of the functions.

Modification Example 2

In the above-described embodiment and modification example, the player characters of the plurality of players are divided into groups to compete against each other. However, the present disclosure is also similarly applicable to the case of the player characters competing against the opponent group of computer-controlled characters and the case of the player characters becoming a partner with computer-controlled characters to compete against the other group.

Instead of group competition, each individual player character may compete against another player character or computer-controlled character. In that case, in the first movement process, a predetermined identification display is provided on the track of movement of the first character that is any competing character. For example, the character color for each competing character is set in advance. The color of the identification display is set as the character color of the first character, and the density of the character color is adjusted in accordance with the character level. In that case, the track level is determined with addition of the character's identification code (character code) to the level value in the same manner as in the foregoing embodiment, the display mode of the identification display is set in accordance with the determined track level, and the identification display is provided at the movement position (appearance position).

On the other hand, in the second movement control process, when the second character that is the same player character as the first character or a second character that is a player character different from the first character has moved through the position with the identification display (the appearance position) in an overlapping manner, the display mode of the identification display at the position is changed depending on whether the second character is the same as the first character. Specifically, the track level is updated in the same manner as in the foregoing embodiment, and the display mode of the identification display is changed in accordance with the updated track level. In order to update the track level, when the first character and the second character are the same, the track level is raised, whereas, when they are different, the track level is lowered. Depending on the magnitude relationship between the level value of the track level and the character level of the first character, the character code is changed to that for the second character.

Modification Example 3

In the above-described embodiment and others, the identification display (for example, the group-specific identification display) is provided at the position where a competing character (for example, a player character) has moved (appearance position). As its effects, the item is caused to appear at the position with the group-specific identification display under the appearance condition in accordance with its track level and scoring points are added to the group-specific score in accordance with the size of the group-specific identification display. In addition, the movement control parameter of each character may be additionally controlled. In that case, the game management section 230, for example, performs a movement control parameter change control process as a movement control parameter change control means.

Specifically, the movement control parameter of a competing character is controlled based on whether the competing character is moving through the position with the group-specific identification display. For example, for the character being moving through the position with the group-specific identification display, the character's moving speed is set based on whether the character's group is the same as the group associated with the group-specific identification display.

To that end, for example, predetermined are respective values of a first moving speed applied to a character being moving through a position with no group-specific identification display, a second moving speed applied to a character being moving through a position with a group-specific identification display associated with the own group, and a third moving speed applied to a character being moving through a position with a group-specific identification display associated with the opponent group. For example, the second moving speed is set to be higher than the first moving speed, and the third moving speed is set to be lower than the first speed. According to this, in order to cause a character to repetitively move through a position with the group-specific identification display associated with the own group so as to raise the track level, the character can move at a higher speed than at the time of moving through other positions. On the other hand, in order to cause a character to move through a position with the group-specific identification display associated with the opponent group in an overlapping manner so as to lower the track level or to change the group-specific identification display of the own group, the character's moving speed is more decelerated than at the time of moving through other positions. However, the second moving speed may be set to be lower than the first moving speed, and the third moving speed may be set to be higher than the first moving speed.

The second moving speed and the third moving speed are not limited to fixed values but may be set variably in accordance with the track level of the group-specific identification display through which the character is moving. For example, on the precondition that the second moving speed is higher than the first moving speed, the second moving speed is set to be higher as the track level is higher. Alternatively, the second moving speed may be set to be lower as the track level is higher. Similarly, on the precondition that the second moving speed is lower than the first moving speed, the second moving speed is set to be lower as the track level is higher. Alternatively, the second moving speed may be set to be higher as the track level is higher.

In addition to or instead of the case where a character is "moving", the movement control parameter of a competing character may be controlled based on whether the competing character has moved through a position with a group-specific identification display. In that case, for a character having moved through a position with a group-specific identification display associated with the own group, a moving speed to be applied for a predetermined time period after the movement is predetermined as the second moving speed, and for a character having moved through a position with a group-specific identification display associated with the opponent group, a moving speed to be applied for a predetermined time period after the movement is predetermined as the third moving speed.

For individual competition, similarly, a movement control parameter of a competing character may be controlled. In that case, the game management section 230, for example, variably controls a moving speed, for example, of a competing character based on whether the character is moving and/or has moved through a position with an identification display, as the movement control parameter change control means.

Modification Example 4

In the above-described embodiment and others, the character level is taken as an example of a parameter value of a player character, and the character level is set in accordance with the number of acquired items such as cookies. On the other hand, the character level of each competing character such as a player character may be set based on the size of an identification display (for example, a group-specific identification display) provided due to the movement of the character. For example, the character level may be raised as the character moves in a wide area and increasingly contributes to extension of the group-specific identification display. The discrimination of characters that have contributed to the group-specific identification display at each position (appearance position) is made depending on whether they are casual characters, for example. Then, for each character, the number of positions (appearance positions) where the character is a casual character is counted and managed, and the character level of the character is updated as needed in accordance with the number. In that case, the correspondence relation between the number of the relevant positions and the character levels is preset in the form of a level conversion table.

In a game where a state parameter described later is variably controlled for each character along with the progress of the game, the value of the state parameter can also be used as a parameter value. For example, in the case of using hit points as a parameter value, the track level can be raised as the quantity of decrease in the hit points of the moving character is small and can be lowered when few hit points are left.

Modification Example 5

In order to determine or update the track level, the superior-to-inferior status of the game may be reflected on the level value at the point in time of determination or updating. For example, at the time of determination or updating of the track level, the degree of superiority or inferiority of the group to which the first character or the second character belong is determined based on the difference between the group-specific scores of the groups. Then, the change quantity of the level value is determined based on the determined degree of superiority or inferiority and the character level of the moving character, and the track level is determined or updated accordingly. The change quantity may be determined to be greater as the group is more superior, or the change quantity may be determined to be greater as the group is more inferior. In the former case, when the own group is superior, the track level associated with the own group's group-specific identification display can be significantly raised or the track level associated with the opponent group's group-specific identification display can be significantly lowered. In contrast, in the latter case, as the own group is more inferior, the track level associated with the own group's group-specific identification display can be significantly raised or the track level associated with the opponent group's group-specific identification display can be significantly lowered. Therefore, it is possible to, as the own group is more inferior, allow items possibly advantageous to the own player character and the own group to be likely to appear from positions with the group-specific identification display associated with the own group, and in reverse, allow such items to be less likely to appear from positions with the group-specific identification display associated with the opponent group.

Modification Example 6

In the above-described embodiment and others, the track level is determined in accordance with the character level of the first character, and the track level is updated in accordance with the character level of the second character. Alternatively, the track level can be determined without using the character levels. For example, the level value of the track level is set to "1" at the time of movement of the first character. Then, while the level value is updated by incrementing by one at each overlapping movement of the second character belonging to the same group as the first character, the level value may be updated by decrementing by one at the time of overlapping movement of the second character belonging to the other group.

According to this, it is possible to raise the track level by causing a character in the same group to repetitively move through the same position (appearance position) so as to change the display mode of the group-specific identification display, and set the appearance condition for the item to appear from there in a manner that is possibly advantageous to the character of that group.

Modification Example 7

The display mode of the identification display (for example, the group-specific identification display) may be changed in cooperation with variation in the parameter value of the casual character. The parameter value may be the value of the character level or may be the value of a state parameter in a game where state parameters such as performance value, experience value, hit points, and magic points, for example, can be variably controlled for each character along with the progress of the game.

In that case, the game management section 230, for example, monitors the changes in the parameter value for each competing character. When any character has the parameter value satisfying a predetermined condition, the game management section 230 performs a control to change the track level of the position where the character is a casual character (appearance position). For example, the stepwise increase amount and/or decrease amount of the parameter value is defined as variation condition, and the correspondence relation between the variation condition and the value to be added to and/or the value to be subtracted from the level value are predetermined. The value to be added of the level value may be set to be greater as the increase amount of the parameter value is greater, and the value to be subtracted can be set to be greater as the decrease amount is greater. When the parameter value of the casual character actually satisfies the variation condition, the level value of the track level at the relevant appearance position is increased or decreased in accordance with the corresponding level value, and the display mode of the group-specific identification display is changed.

When the level value is equal to or less than the value to be subtracted, the group-specific identification display at the relevant appearance position may be erased. Besides, when the casual character is defeated or the player is out of the game due to the defeat, the group-specific identification display at the relevant appearance position may be erased. Furthermore, the number of characters defeated during the game or the number of players out of the game are counted for each group, and the track level of the group-specific identification display associated with the relevant group may be lowered with increase in the counted numbers or the group-specific identification display may be erased when the counted numbers have reached a predetermined number. In reverse, the track level may be raised with increase in the counted numbers.

Alternatively, the display mode of the group-specific identification display may be subjected to change control in conjunction with the variation in the subsequent state parameter of the first character having caused the provision of the group-specific identification display. In that case, the game management section 230, for example, manages the state parameter of each competing character, as the state parameter management means. Then, the game management section 230 performs the change control on the display mode of the group-specific identification display in accordance with the state parameter of the first character. The game management section 230 may perform a change control on the display mode of the group-specific identification display in conjunction with the variation in the state parameter of the casual character or another second character other than the first character.

Modification Example 8

When the second character has moved in an overlapping manner, if the group color associated with the group-specific identification display at the overlapping movement position is different from the group color of the second character's group, the display mode of the group-specific identification display may be changed in such a manner that the respective group colors of the groups are mixed into a new display color. At that time, the mixing proportion of the colors may be adjusted to set the display color in accordance with a time lag from the previous movement to the current movement of the player character 12 through the appearance position 111. For example, as the time lag is shorter, the mixing proportion of the original color of the group-specific identification display may be higher.

In that case, the appearance condition for each estimated mixing color may be determined based on the combination of the colors prepared as group colors. Then, using the appearance conditions in accordance with the mixed color of the provided group-specific identification display, the item may be caused to appear at the position of the group-specific identification display.

Modification Example 9

In a game where, out of positions in a game space in which competing characters are each movable, items are caused to appear at both positions with identification displays such as group-specific identification displays and positions without those identification displays, items may be caused to appear at the positions to which appearance conditions are applied depending on whether any identification display is provided.

For example, a first appearance condition is applied to the positions with the identification displays in a manner similar to that in the above-described embodiment, whereas a second appearance condition is applied to the positions without the identification displays. In that case, appearance condition data respectively defining the first appearance condition and the second appearance condition are prepared in advance in a manner similar to that with the level-specific appearance condition data 523. As compared to the second appearance condition data, the first appearance condition data can include many settings that can be advantageous for characters having moved through the appearance positions, characters having acquired the items appearing at those positions, and those characters' groups.

The game management section 230, for example, performs an item appearance control by setting the first appearance condition as the applied appearance condition for the positions with the identification displays, and also sets the second appearance condition as the applied appearance condition for the positions without the identification displays, as the second item appearance control means. Then, the game management section 230 performs a control to cause the items to appear at the positions based on the second appearance condition.

Modification Example 10

In the above-described embodiments and others, the display color of the identification display (for example, the group-specific identification display) at the position through which the second character has moved in an overlapping manner is changed, and the display of the movement position in the changed display color is controlled, thereby to change the display mode of the identification display. Alternatively, the group-specific identification display at the movement position may be erased temporarily and then a new group-specific identification display may be provided in accordance with the setting of a new display color, thereby to change the display mode. In either case, the original display color is not overwritten by a new display color.

Modification Example 11

In the above-described embodiment and others, the game progresses such that the competing characters are moved in the game space to acquire items as an example. However, applicable games are not limited to this. For example, the present disclosure is also similarly applicable to a game where characters are moved in a game space to extend their territories by provision of identification displays (for example, group-specific identification displays) on the tracks of their movement.

Besides, the present disclosure may be applied to a car racing game where the display colors of tire marks at the positions of movement of cars (characters) are set and identification displays are provided on the tracks of the movement. The mode of providing identification displays on the tracks of movement of characters is not limited to setting the display colors at the movement positions. For example, when a character moves, a part of the character may remain at the movement position so that an identification display may be provided on the track of movement of the character movement. For example, in a game where characters of yarn balls are rolled in a game space, when a character (yarn ball) is moved, the yarn is unwound and displayed along the movement positions. Then, an identification display may be provided on the track of movement of the character by display of the unwound yarn.

In the above-described embodiment and others, when a player character has moved through the appearance position 111 with an identification display (for example, a group-specific identification display) in an overlapping manner, the track level is updated and the item is caused to appear at the appearance position 111 under the appearance condition in accordance with the updated track level. Alternatively, when a player character has moved through a position with a group-specific identification display of the opponent group, the player character can cause damage to a player character in the opponent group. For example, in the case where a player character in the own group has weakened a player character 12 in the opponent group or the like by acquiring the power cookie 15 and has moved through a position with a group-specific identification display where the player character 12 in the opponent group is a casual character before a lapse of the weakening time, the player character in the own group can cause damage to the player character 12 in the opponent group located on the group-specific identification display. In the case where characters are yarn balls and the identification display is provided by unwound yarn as described above, when a character passes over the unwound yarn, the character may move at a high speed to the position of the yarn ball as a casual character along the unwound yarn or in reverse may pull the unwound yarn to draw the yarn ball as the casual character so as to attack the casual character.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

Summarization

The present disclosure can be summarized as follows:

In accordance with the first disclosure, there is provided a computer system comprising:

at least one processor or circuit programmed to:

manage a game where a plurality of characters including a player character operated by at least one player move in a game space;

perform a control to provide a predetermined identification display on a track of movement of a first character; and when a second character that is the same character as the first character or a character different from the first character has moved through a position with the identification display in an overlapping manner, change a display mode of the identification display.

As a result, in some embodiments, it is possible to provide a predetermined identification display on the track of movement of the first character. In addition, when the same character has moved again, as the second character, through the position with the identification display provided due to the movement of the first character in an overlapping manner or when a character different from the first character has moved through that position as the second character in an overlapping manner, it is possible to change the identification display at the overlapping movement position. As a result, in some embodiments, in the game where the player enjoys performing operations to move a character, the identification display provided on the track of movement of the character is changed, thereby producing a new interest in the identification display.

In the computer system, the characters may be divided into groups in advance, the identification display may be a group-specific identification display by which the group is identifiable, and changing the display mode of the identification display may include causing the change in the display mode of the group-specific identification display at the position having undergone the overlapping movement to vary depending on whether the group of the first character and the group of the second character are the same.

As a result, in some embodiments, it is possible to, when a character has moved, provide the group-specific identification display by which the character's group is identifiable. When the second character has moved through the position with the group-specific identification display provided due to the earlier movement of the first character, in an overlapping manner, it is possible to change the group-specific display mode at the overlapping movement position depending on whether the first character's group and the second character's group are the same.

In the computer system, the group-specific identification display may have a track level, and changing the display mode of the identification display may include:

when the group of the first character and the group of the second character are the same, changing the display mode of the group-specific identification display by performing a control to raise the track level of the group-specific identification display at the position having undergone the overlapping movement; and when the group of the first character and the group of the second character are different, changing the display mode of the group-specific identification display by performing a control to lower the track level of the group-specific identification display at the position having undergone the overlapping movement.

As a result, in some embodiments, it is possible to determine the track level for the group-specific identification display. When the second character in the same group as the first character has moved through the position with the group-specific identification display in an overlapping manner, it is possible to raise the track level, whereas when these characters belong to different groups, it is possible to lower the track level, whereby the display mode of the group-specific identification display at the overlapping movement position can be changed in accordance with the track level.

In the computer system, the at least one processor or circuit may be further programmed to:

perform a control to cause an item acquirable for the characters to appear at the position with the group-specific identification display;

perform a control to cause the character having moved through the arrangement position of the item to acquire the item; and calculate a game score by group based on the item acquired.

As a result, in some embodiments, it is possible to execute the game in such a manner as to cause the item to appear at the position with the group-specific identification display, cause the character having moved through the position to acquire the item, and calculate the game score by group based on the items acquired by the characters.

In the computer system, the control to cause the item to appear may include performing a control to cause the item to appear under a given appearance condition determined based on the track level of the group-specific identification display.

As a result, in some embodiments, it is possible to cause the item to appear at the position with the group-specific identification display under the appearance condition in accordance with the track level.

In the computer system, the appearance condition may include at least one condition of type, number, and appearance timing of the item to be caused to appear.

As a result, in some embodiments, it is possible to cause the item of the type in accordance with the track level at the position with the group-specific identification display, cause a number of items in accordance with the track level to appear, or cause the item to appear at the appearance timing in accordance with the track level.

In the computer system, the at least one processor or circuit may be further programmed to:

variably control a movement control parameter of the character based on whether the character is moving and/or has moved through the position with the group-specific identification display associated with the group of the character.

As a result, in some embodiments, depending on whether the group of the character being moving through the position with the group-specific identification display is the same as the group associated with the group-specific identification display, it is possible to accelerate or decelerate the moving speed, for example, of the character being moving. Alternatively, depending on whether the group of the character having moved through the position with the group-specific identification display is the same as the group associated with the group-specific identification display, it is possible to accelerate or decelerate the moving speed, for example, of the character after the movement.

In the computer system, variably controlling the movement control parameter may include variably controlling the movement control parameter of the character based on whether the character is moving and/or has moved through the position with the group-specific identification display associated with a group different from the group of the character.

As a result, in some embodiments, depending on whether the character is moving through the position with the group-specific identification display associated with the group different from the character's group, it is possible to accelerate or decelerate the moving speed, for example, of the character being moving. Alternatively, depending on whether the character has moved through the position with the group-specific identification display associated with the group different from the character's group, it is possible to accelerate or decelerate the moving speed, for example, of the character after the movement.

In the computer system, the at least one processor or circuit may be further programmed to:

calculate the game score by group based on a size of the group-specific identification display at a given timing or a ratio of the sizes between the groups.

As a result, in some embodiments, for example, it is possible to calculate the group-specific game scores, taking into account the sizes of the group-specific identification displays of the group or the ratio between the sizes of the groups during the game or at the end of the game.

In the computer system, changing the display mode of the identification display may include causing the change in the display mode of the identification display at the position having undergone the overlapping movement to vary depending on whether the first character and the second character are the same.

As a result, in some embodiments, when the second character has moved through the position with the identification display provided due to the movement of the first character, in an overlapping manner, it is possible to change the display mode of the identification display at the overlapping movement position depending on whether the second character is the same as the first character.

In the computer system, the identification display may have a track level, and changing the display mode of the identification display may include:

when the first character and the second character are the same, changing the display mode of the identification display by performing a control to raise the track level of the identification display at the position having undergone the overlapping movement; and when the first character and the second character are different, changing the display mode of the identification display by performing a control to lower the track level of the identification display at the position having undergone the overlapping movement.

As a result, in some embodiments, it is possible to determine the track level for the identification display. When the same character as the first character has moved through the position with the identification display as the second character in an overlapping manner, the track level is raised, whereas when a character different from the first character has moved through the position as the second character in an overlapping manner, the track level is lowered so that the display mode of the identification display at the overlapping movement position can be changed in accordance with the track level.

In the computer system, the at least one processor or circuit may be further programmed to:

manage a state parameter of each character variably controlled in accordance with progress of the game; and perform a change control on the display mode of the identification display based on a value of the state parameter of the first character.

As a result, in some embodiments, it is possible to change the identification display associated with the first character in accordance with the subsequent change in the value of the state parameter of the first character having caused the provision of the identification display.

In the computer system, the identification display may be set with a given lifetime, and the at least one processor or circuit may be further programmed to:

perform a control to erase the identification display when the lifetime of the identification display has elapsed. As a result, in some embodiments, the identification display that is provided due to the movement of the first character and of which the display mode is changed due to the movement of the second character, can be erased at a timing in accordance with the lifetime set for the identification display.

A server system that is the computer system, and the server system may be communicably connected to a player terminal of each player to control execution of the game.

A game system comprising:

a player terminal of each player; and the above server system that is communicably connected to the player terminal.

According to the second disclosure, there is provide a computer system comprising:

at least one processor or circuit programmed to:

manage a game where a plurality of characters including a player character operated by at least one player are moved in a game space and caused to acquire an item arranged in the game space;

perform a control on each character to provide a predetermined identification display on a track of movement of the character; and perform a control to cause the item to appear at the position with the identification display;

perform a control to cause the character having moved through the arrangement position of the item to acquire the item; and control progress of the game based on an acquisition result of the item.

As a result, in some embodiments, it is possible to provide the identification display on the track of the movement of the character, cause the item to appear at the position with the identification display, cause the character having moved through the position to acquire the item, and control the progress of the game based on the items acquired by the characters. Therefore, in a game where players enjoy performing operations to move the characters, it is possible to achieve the technique for adding interest to the track of movement of characters.

In the computer system, the at least one processor or circuit may be further programmed to:

variably control a movement control parameter of the character based on whether the character is moving and/or has moved through the position with the group-specific identification display associated with the group of the character.

As a result, in some embodiments, depending on whether the group of the character being moving through the position with the group-specific identification display is the same as the group associated with the group-specific identification display, it is possible to accelerate or decelerate the moving speed, for example, of the character being moving. Alternatively, depending on whether the group of the character having moved through the position with the group-specific identification display is the same as the group associated with the group-specific identification display, it is possible to accelerate or decelerate the moving speed, for example, of the character after the movement.

According to the third disclosure, there is provided a computer system comprising:

at least one processor or circuit programmed to:

manage a game where a plurality of characters including a player character operated by at least one player move in a game space;

change a parameter value of the character based on play status of the character; and perform a control to provide an identification display of a display mode in accordance with the parameter value of the character on a track of movement of the character.

As a result, in some embodiments, it is possible to provide the predetermined identification display on the track of movement of the character. At that time, the identification display can be provided in the display mode in accordance with the parameter value of the moving character that varies depending on the play status. As a result, in some embodiments, in the game where the player enjoys performing operations to move a character, it is possible to produce a new interest for the identification display to be provided on the track of movement of the character.

In the computer system, the at least one processor or circuit may be further programmed to:

perform a control to provide the identification display on a track of movement of a first character; and when a second character that is the same character as the first character or a character different from the first character has moved through a position with the identification display in an overlapping manner, change a display mode of the identification display.

As a result, in some embodiments, when the same character has moved again, as the second character, through the position with the identification display provided due to the movement of the first character in an overlapping manner or when a character different from the first character has moved through that position as the second character in an overlapping manner, it is possible to change the identification display at the overlapping movement position.

What is claimed is:

1. A computer system comprising:
   at least one processor or circuit programmed to:
   execute a game on a display interface of the computer system, the game including gameplay where a plurality of characters include a first character operated by at least one player move in a game space;
   perform a control of the display interface to provide a predetermined identification display on a track of movement of a first character; and
   when a second character, which is the same character as the first character or a character different from the first character, has moved through a position on the track of movement with the identification display in an overlapping manner, change a display mode of the identification display on the display interface.

2. The computer system as defined in claim 1, wherein:
   the plurality of characters are divided into groups in advance,
   the identification display is a group-specific identification display by which the group is identifiable, and
   changing the display mode of the identification display includes causing the change in the display mode of the group-specific identification display at the position having undergone the overlapping movement to vary depending on whether the group of the first character and the group of the second character are the same.

3. The computer system as defined in claim 2, wherein the group-specific identification display has a track level, and
   changing the display mode of the identification display includes:
   when the group of the first character and the group of the second character are the same, changing the display mode of the group-specific identification display by performing a control to raise the track level of the group-specific identification display at the position having undergone the overlapping movement; and
   when the group of the first character and the group of the second character are different, changing the display mode of the group-specific identification display by performing a control to lower the track level of the group-specific identification display at the position having undergone the overlapping movement.

4. The computer system as defined in claim 2, wherein the at least one processor or circuit is further programmed to:
   perform a control to cause an item acquirable for the characters to appear at the position with the group-specific identification display;
   perform a control to cause the character that moved through the position of the item to acquire the item; and
   calculate a game score by group based on the item acquired.

5. The computer system as defined in claim 4, wherein the performed control to cause the item to appear at the position with the group-specific identification display includes performing a control to cause the item to appear under a given appearance condition determined based on the track level of the group-specific identification display.

6. The computer system as defined in claim 5, wherein the appearance condition includes at least one condition of type, number, and appearance timing of the item to be caused to appear.

7. The computer system as defined in claim 2, wherein the at least one processor or circuit is further programmed to:
   variably control a movement control parameter of the character based on whether the character is moving or has moved through the position with the group-specific identification display associated with the group of the character.

8. The computer system as defined in claim 7, wherein variably controlling the movement control parameter is based on whether the character is moving or has moved through the position with the group-specific identification display associated with a group different from the group of the character.

9. The computer system as defined in claim 2, wherein the at least one processor or circuit is further programmed to:
   calculate a game score by group based on a size of the group-specific identification display at a given timing or a ratio of the sizes between the groups.

10. The computer system as defined in claim 1, wherein changing the display mode of the identification display includes causing the change in the display mode of the identification display at the position having undergone the overlapping movement to vary depending on whether the first character and the second character are the same.

11. The computer system as defined in claim 10, wherein the identification display has a track level, and
    changing the display mode of the identification display includes:
    when the first character and the second character are the same, changing the display mode of the identification display by performing a control to raise the track level of the identification display at the position having undergone the overlapping movement; and
    when the first character and the second character are different, changing the display mode of the identification display by performing a control to lower the track level of the identification display at the position having undergone the overlapping movement.

12. The computer system as defined in claim 1, wherein the at least one processor or circuit is further programmed to:
    manage a state parameter of each character variably controlled in accordance with progress of the game; and perform a change control on the display mode of the identification display based on a value of the state parameter of the first character.

13. The computer system as defined in claim 1, wherein the identification display is set with a given lifetime, and the at least one processor or circuit is further programmed to perform a control to erase the identification display when the given lifetime of the identification display has elapsed.

14. A server system that is the computer system as defined in claim 1, wherein the server system is communicably connected to a player terminal of each player to control execution of the game.

15. A game system comprising:
a player terminal of each player; and
the server system as defined in claim 14 that is communicably connected to the player terminal.

16. A computer system comprising:
at least one processor or circuit programmed to:
   execute a game on a display interface of the computer system, the game including gameplay where a plurality of characters include a character operated by at least one player are moved in a game space and caused to acquire an item arranged in the game space;
   perform a control of the display interface on each character to provide a predetermined identification display on a track of movement of the character; and
   perform a control of the display interface to cause the item to appear at a position track of movement with the identification display;
   perform a control of the display interface to cause the character having moved through the position of the item to acquire the item; and
   control progress of the game based on an acquisition result of the item.

17. The computer system as defined in claim 16, wherein the at least one processor or circuit is further programmed to:
   variably control a movement control parameter of the character based on whether the character is moving or has moved through the position with a group-specific identification display associated with a group of the character.

18. A computer system comprising:
at least one processor or circuit programmed to:
   execute a game on a display interface of the computer system, the game including gameplay where a plurality of characters include a first character operated by at least one player move in a game space;
   change a parameter value of the first character based on play status of the first character;
   perform a control of the display interface to provide an identification display of a display mode in accordance with the parameter value of the first character on a track of movement of the first character;
   when a second character, which is the same character as the first character or a character different from the first character, has moved through a position on the track of movement with the identification display in an overlapping manner, change a display mode of the identification display on the display interface.

19. An execution control method of a game executed by a computer system, the method comprising:
   executing, by the computer system, a game on a display interface of the computer system, the game including gameplay where a plurality of characters include a first character operated by at least one player move in a game space;
   performing, by the computer system, a control of the display interface to provide a predetermined identification display on a track of movement of the first character; and
   when a second character, which is the same character as the first character or a character different from the first character, has moved through a position on the track of movement with the identification display in an overlapping manner, changing, by the computer system, a display mode of the identification display on the display interface.

* * * * *